US012754602B1

(12) United States Patent
Ge

(10) Patent No.: US 12,754,602 B1
(45) Date of Patent: Oct. 6, 2026

(54) UNLOCKING XR GLASSES

(71) Applicant: Snap Inc., Santa Monica, CA (US)

(72) Inventor: Linhui Ge, Sammamish, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/427,168

(22) Filed: Jan. 30, 2024

(51) Int. Cl.
*G06F 3/01* (2006.01)
*G06F 21/32* (2013.01)
*G06V 10/82* (2022.01)
*G06V 40/20* (2022.01)

(52) U.S. Cl.
CPC .............. *G06F 3/011* (2013.01); *G06F 3/017* (2013.01); *G06F 21/32* (2013.01); *G06V 10/82* (2022.01); *G06V 40/20* (2022.01)

(58) Field of Classification Search
CPC .......................... H04L 63/0861; G02B 27/017
See application file for complete search history.

(56) References Cited

U.S. PATENT DOCUMENTS 6,819,982 B2 11/2004 Doane
7,542,073 B2 6/2009 Li et al.
7,971,156 B2 6/2011 Albertson et al.
8,174,562 B2 5/2012 Hartman
8,274,550 B2 9/2012 Steuart, III
8,646,720 B2 2/2014 Shaw
8,963,806 B1 * 2/2015 Starner .................. G06F 21/32 345/7
9,225,897 B1 12/2015 Sehn
9,274,599 B1 * 3/2016 D'Amico ................ G06F 21/32
9,276,886 B1 3/2016 Samaranayake
9,344,642 B2 5/2016 Niemi et al.
9,345,711 B2 5/2016 Friedhoff
9,471,059 B1 10/2016 Wilkins
9,489,937 B1 11/2016 Beard et al.
9,576,369 B2 2/2017 Venkataraman et al.
9,589,448 B1 3/2017 Schneider et al.
9,681,046 B2 6/2017 Adsumilli et al.
9,705,831 B2 7/2017 Spiegel
9,723,272 B2 8/2017 Lu et al.
(Continued)

FOREIGN PATENT DOCUMENTS

EP 3707693 A1 9/2020
EP 4172726 A1 5/2023
(Continued)

OTHER PUBLICATIONS

US 10,656,660 B1, 05/2020, Meisenholder et al. (withdrawn)
(Continued)

*Primary Examiner* — Sepehr Azari
(74) *Attorney, Agent, or Firm* — Schwegman Lundberg & Woessner, P.A.

(57) ABSTRACT

A user provided the opportunity to unlock an extended reality (XR) wearable device. Example methods include receiving a wakeup signal, capturing an image using an image capturing device of the XR wearable device, identifying a body part of a user within the image, verifying the body part is a body part of an authorized user, and in response to a determination that the body part is the body part of the user, unlocking the XR wearable device. The method may include capturing a plurality of images using the image capturing device, and identifying a gesture performed by the user.

20 Claims, 15 Drawing Sheets

(56) References Cited

U.S. PATENT DOCUMENTS

| | | | | |
|---|---|---|---|---|
| 9,742,713 | B2 | 8/2017 | Spiegel et al. | |
| 9,747,901 | B1 | 8/2017 | Gentry | |
| 9,922,659 | B2 | 3/2018 | Bradlow et al. | |
| 9,989,965 | B2 | 6/2018 | Cuban et al. | |
| 10,061,328 | B2 | 8/2018 | Canoy et al. | |
| 10,102,423 | B2 | 10/2018 | Shaburov et al. | |
| 10,109,224 | B1 | 10/2018 | Ratti et al. | |
| 10,140,987 | B2 | 11/2018 | Erickson et al. | |
| 10,168,700 | B2 | 1/2019 | Gordon et al. | |
| 10,284,508 | B1 | 5/2019 | Allen et al. | |
| 10,370,118 | B1 | 8/2019 | Nielsen et al. | |
| 10,439,972 | B1 | 10/2019 | Spiegel et al. | |
| 10,501,180 | B2 | 12/2019 | Yu | |
| 10,509,466 | B1 | 12/2019 | Miller et al. | |
| 10,514,876 | B2 | 12/2019 | Sehn | |
| 10,579,869 | B1 | 3/2020 | Xiong et al. | |
| 10,591,730 | B2 | 3/2020 | Rodriguez, II | |
| 10,606,364 | B2 * | 3/2020 | Smith | G06F 3/017 |
| 10,614,855 | B2 | 4/2020 | Huang | |
| 10,748,347 | B1 | 8/2020 | Li et al. | |
| 10,749,967 | B2 | 8/2020 | Van Os et al. | |
| 10,768,639 | B1 | 9/2020 | Meisenholder et al. | |
| 10,783,576 | B1 | 9/2020 | Van Os et al. | |
| 10,798,109 | B2 | 10/2020 | Ford | |
| 10,936,067 | B1 | 3/2021 | Chand et al. | |
| 10,958,608 | B1 | 3/2021 | Allen et al. | |
| 10,962,809 | B1 | 3/2021 | Castañeda | |
| 10,996,846 | B2 | 5/2021 | Robertson et al. | |
| 10,997,787 | B2 | 5/2021 | Ge et al. | |
| 11,012,390 | B1 | 5/2021 | Al Majid et al. | |
| 11,030,454 | B1 | 6/2021 | Xiong et al. | |
| 11,036,368 | B1 | 6/2021 | Al Majid et al. | |
| 11,062,498 | B1 | 7/2021 | Voss et al. | |
| 11,087,728 | B1 | 8/2021 | Canberk et al. | |
| 11,092,998 | B1 | 8/2021 | Castañeda et al. | |
| 11,106,342 | B1 | 8/2021 | Al Majid et al. | |
| 11,107,280 | B1 * | 8/2021 | Clohset | G06F 3/04815 |
| 11,126,206 | B2 | 9/2021 | Meisenholder et al. | |
| 11,143,867 | B2 | 10/2021 | Rodriguez, II | |
| 11,169,600 | B1 | 11/2021 | Canberk et al. | |
| 11,227,626 | B1 | 1/2022 | Krishnan Gorumkonda et al. | |
| 11,307,747 | B2 | 4/2022 | Dancie et al. | |
| 11,531,402 | B1 | 12/2022 | Stolzenberg | |
| 11,546,505 | B2 | 1/2023 | Canberk | |
| 11,798,201 | B2 | 10/2023 | Eirinberg et al. | |
| 2007/0250526 | A1 | 10/2007 | Hanna | |
| 2008/0255842 | A1 | 10/2008 | Simhi | |
| 2009/0122133 | A1 | 5/2009 | Hartman | |
| 2012/0194420 | A1 | 8/2012 | Osterhout et al. | |
| 2012/0287274 | A1 | 11/2012 | Bevirt | |
| 2013/0056581 | A1 | 3/2013 | Sparks | |
| 2013/0238168 | A1 | 9/2013 | Reyes | |
| 2014/0254896 | A1 | 9/2014 | Zhou et al. | |
| 2015/0022432 | A1 | 1/2015 | Stewart et al. | |
| 2015/0070272 | A1 | 3/2015 | Kim et al. | |
| 2015/0153825 | A1 * | 6/2015 | Lee | G06F 1/1694<br>345/8 |
| 2015/0175263 | A1 | 6/2015 | Reyes | |
| 2015/0199022 | A1 | 7/2015 | Gottesman et al. | |
| 2015/0212681 | A1 * | 7/2015 | Shinozaki | G02B 27/017<br>345/8 |
| 2015/0287246 | A1 | 10/2015 | Huston et al. | |
| 2015/0331490 | A1 | 11/2015 | Yamada | |
| 2015/0362917 | A1 | 12/2015 | Wang et al. | |
| 2016/0063987 | A1 | 3/2016 | Xu et al. | |
| 2016/0109914 | A1 * | 4/2016 | Blum | G06F 3/011<br>713/300 |
| 2016/0161946 | A1 | 6/2016 | Wuth Sepulveda et al. | |
| 2016/0179096 | A1 | 6/2016 | Bradlow et al. | |
| 2016/0259986 | A1 * | 9/2016 | Yun | G06F 21/32 |
| 2016/0292886 | A1 | 10/2016 | Erad et al. | |
| 2016/0307573 | A1 | 10/2016 | Wobrock | |
| 2016/0336020 | A1 | 11/2016 | Bradlow et al. | |
| 2017/0031369 | A1 | 2/2017 | Liu et al. | |
| 2017/0094259 | A1 | 3/2017 | Kouperman et al. | |
| 2017/0099424 | A1 | 4/2017 | Jones | |
| 2017/0102699 | A1 | 4/2017 | Anderson | |
| 2017/0177925 | A1 | 6/2017 | Volkart | |
| 2017/0225796 | A1 | 8/2017 | Sun et al. | |
| 2017/0228690 | A1 | 8/2017 | Kohli | |
| 2017/0244937 | A1 | 8/2017 | Meier et al. | |
| 2017/0320564 | A1 | 11/2017 | Kuzikov | |
| 2017/0337791 | A1 | 11/2017 | Gordon-carroll | |
| 2017/0371353 | A1 | 12/2017 | Millinger, III | |
| 2018/0018451 | A1 * | 1/2018 | Spizhevoy | G06V 40/19 |
| 2018/0082682 | A1 | 3/2018 | Erickson et al. | |
| 2018/0246529 | A1 | 8/2018 | Hu et al. | |
| 2019/0011921 | A1 | 1/2019 | Wang et al. | |
| 2019/0146219 | A1 | 5/2019 | Rodriguez, II | |
| 2020/0064921 | A1 * | 2/2020 | Kang | G02B 27/01 |
| 2020/0241575 | A1 | 7/2020 | Meisenholder et al. | |
| 2021/0011612 | A1 | 1/2021 | Dancie et al. | |
| 2021/0074016 | A1 | 3/2021 | Li et al. | |
| 2021/0149494 | A1 | 5/2021 | Chand et al. | |
| 2021/0166732 | A1 | 6/2021 | Shaburova et al. | |
| 2021/0174034 | A1 | 6/2021 | Retek et al. | |
| 2021/0241529 | A1 | 8/2021 | Cowburn et al. | |
| 2021/0303075 | A1 | 9/2021 | Cowburn et al. | |
| 2021/0303077 | A1 | 9/2021 | Anvaripour et al. | |
| 2021/0303140 | A1 | 9/2021 | Mourkogiannis | |
| 2021/0362848 | A1 | 11/2021 | Spencer | |
| 2021/0382503 | A1 | 12/2021 | Meisenholder et al. | |
| 2021/0382564 | A1 | 12/2021 | Blachly et al. | |
| 2021/0397000 | A1 | 12/2021 | Rodriguez, II | |
| 2021/0405761 | A1 | 12/2021 | Canberk | |
| 2022/0099983 | A1 * | 3/2022 | Yliniemelä | G02B 27/0176 |
| 2022/0188539 | A1 | 6/2022 | Chan et al. | |
| 2022/0206581 | A1 | 6/2022 | Powell et al. | |
| 2022/0206582 | A1 | 6/2022 | Powell et al. | |
| 2022/0206583 | A1 | 6/2022 | Powell et al. | |
| 2022/0206584 | A1 | 6/2022 | Powell et al. | |
| 2022/0206588 | A1 | 6/2022 | Canberk et al. | |
| 2022/0210370 | A1 | 6/2022 | Thomas et al. | |
| 2022/0300730 | A1 | 9/2022 | Eirinberg et al. | |
| 2022/0300731 | A1 | 9/2022 | Eirinberg et al. | |
| 2022/0301231 | A1 | 9/2022 | Eirinberg et al. | |
| 2022/0317773 | A1 | 10/2022 | Powell et al. | |
| 2022/0317774 | A1 | 10/2022 | Powell et al. | |
| 2022/0317775 | A1 | 10/2022 | Powell et al. | |
| 2022/0326781 | A1 | 10/2022 | Hwang et al. | |
| 2022/0334649 | A1 | 10/2022 | Hwang et al. | |
| 2022/0375174 | A1 | 11/2022 | Arya et al. | |
| 2023/0054827 | A1 * | 2/2023 | Yamanaka | G06F 21/31 |
| 2023/0097257 | A1 | 3/2023 | Powell et al. | |
| 2024/0220015 | A1 * | 7/2024 | Tsai | G06F 3/014 |

FOREIGN PATENT DOCUMENTS

| | | | |
|---|---|---|---|
| EP | 4172730 | A1 | 5/2023 |
| KR | 20220158824 | A | 12/2022 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022060549 | A3 | 4/2022 |
| WO | WO-2022132381 | A1 | 6/2022 |
| WO | WO-2022146678 | A1 | 7/2022 |
| WO | WO-2022147151 | A1 | 7/2022 |
| WO | WO-2022147158 | A1 | 7/2022 |
| WO | WO-2022147449 | A1 | 7/2022 |
| WO | WO-2022147450 | A1 | 7/2022 |
| WO | WO-2022147451 | A1 | 7/2022 |
| WO | WO-2022198182 | A1 | 9/2022 |
| WO | WO-2022212174 | A1 | 10/2022 |
| WO | WO-2022212175 | A1 | 10/2022 |
| WO | WO-2022212177 | A1 | 10/2022 |
| WO | WO-2022216784 | A1 | 10/2022 |

(56) References Cited

FOREIGN PATENT DOCUMENTS

| | | | |
|---|---|---|---|
| WO | WO-2022225761 | A1 | 10/2022 |
| WO | WO-2022245765 | A1 | 11/2022 |

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 17, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

* cited by examiner

UNLOCKING XR GLASSES

TECHNICAL FIELD

Examples of the present disclosure relate generally to unlocking augmented reality (AR), mixed reality (MR), virtual reality (VR), and/or extended reality (XR) wearable devices. More particularly, but not by way of limitation, examples of the present disclosure relate to an XR wearable device receiving a wakeup signal and powering up an image capturing device in response to receiving the wakeup signal. The image capturing device is then used to verify the identity of the user.

BACKGROUND

XR wearable devices are becoming ubiquitous. Additionally, users increasingly want to be able to operate the XR wearable devices securely with little effort on the part of the user. But often it is difficult to operate the XR wearable devices securely and to make them easily accessible to the users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

AR, MR, VR, and/or XR wearable devices, which collectively will be referred to as XR wearable devices, are becoming ubiquitous and often users of the XR wearable devices would like to unlock the XR wearable devices with as little effort as possible and yet be certain that their XR wearable devices are secure from intruders.

A technical challenge is unlocking XR wearable devices with little effort from a user while ensuring security and persevering the battery power. In some examples, the technical challenge is addressed by permitting the XR wearable device to go into a sleep mode. The XR wearable device is awakened by a signal from a sensor, input/output (IO) device, or a wireless module. The XR wearable device once awake captures an image of a body part of a user and uses biometrics identification (BIO ID) to ensure the body part is that of the user.

In some examples, the XR wearable device requires that a gesture be performed by the user in addition to the BIO ID. For example, the user may have to form a peace sign with their hand before the BIO ID. In some examples, the wakeup signal is generated without requiring electronic components to remain powered on. For example, a hinge of the XR wearable device may generate a signal to wake up the XR wearable device when the hinge is opened.

Networked Computing Environment

Figure 1:
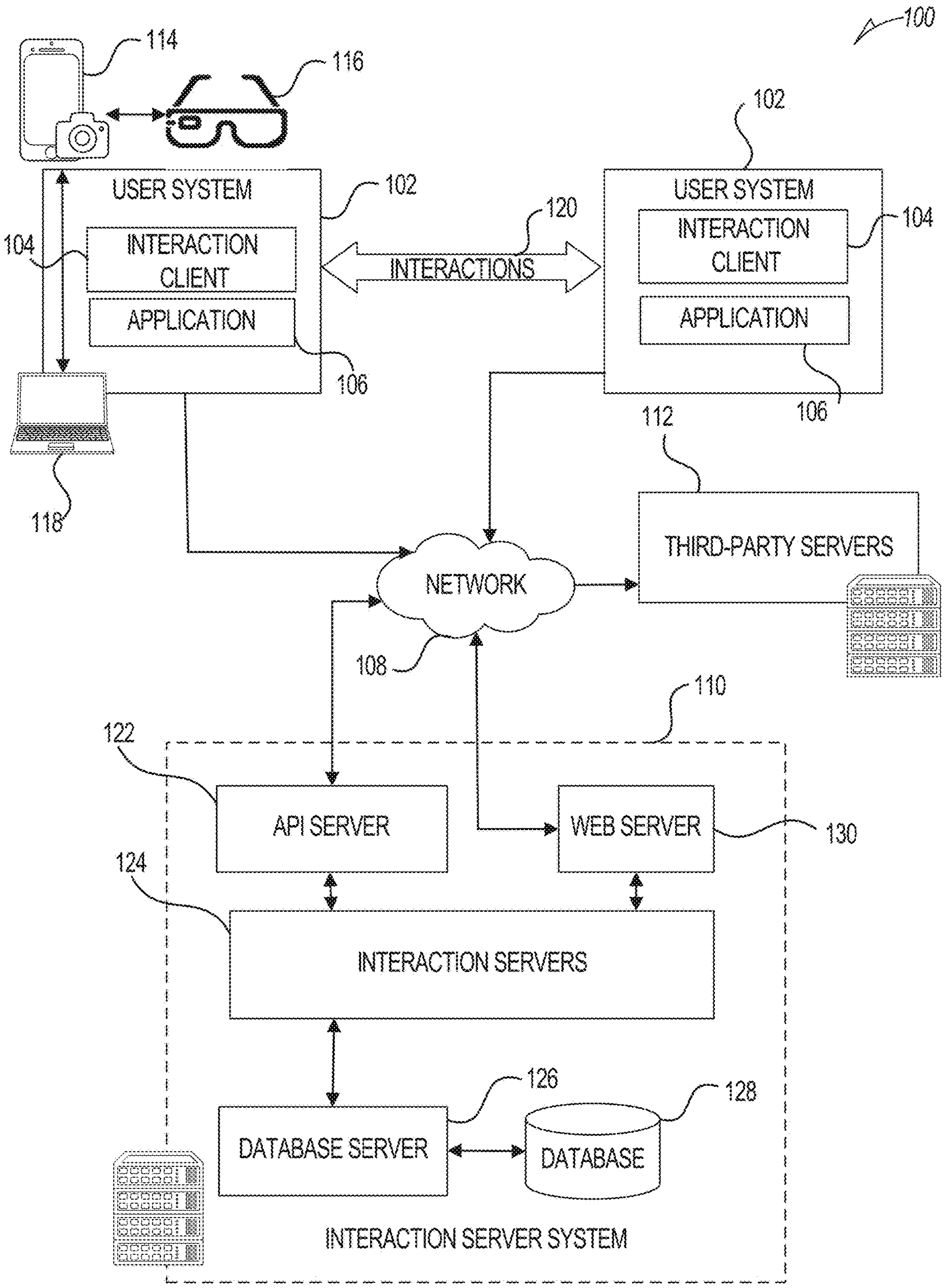
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
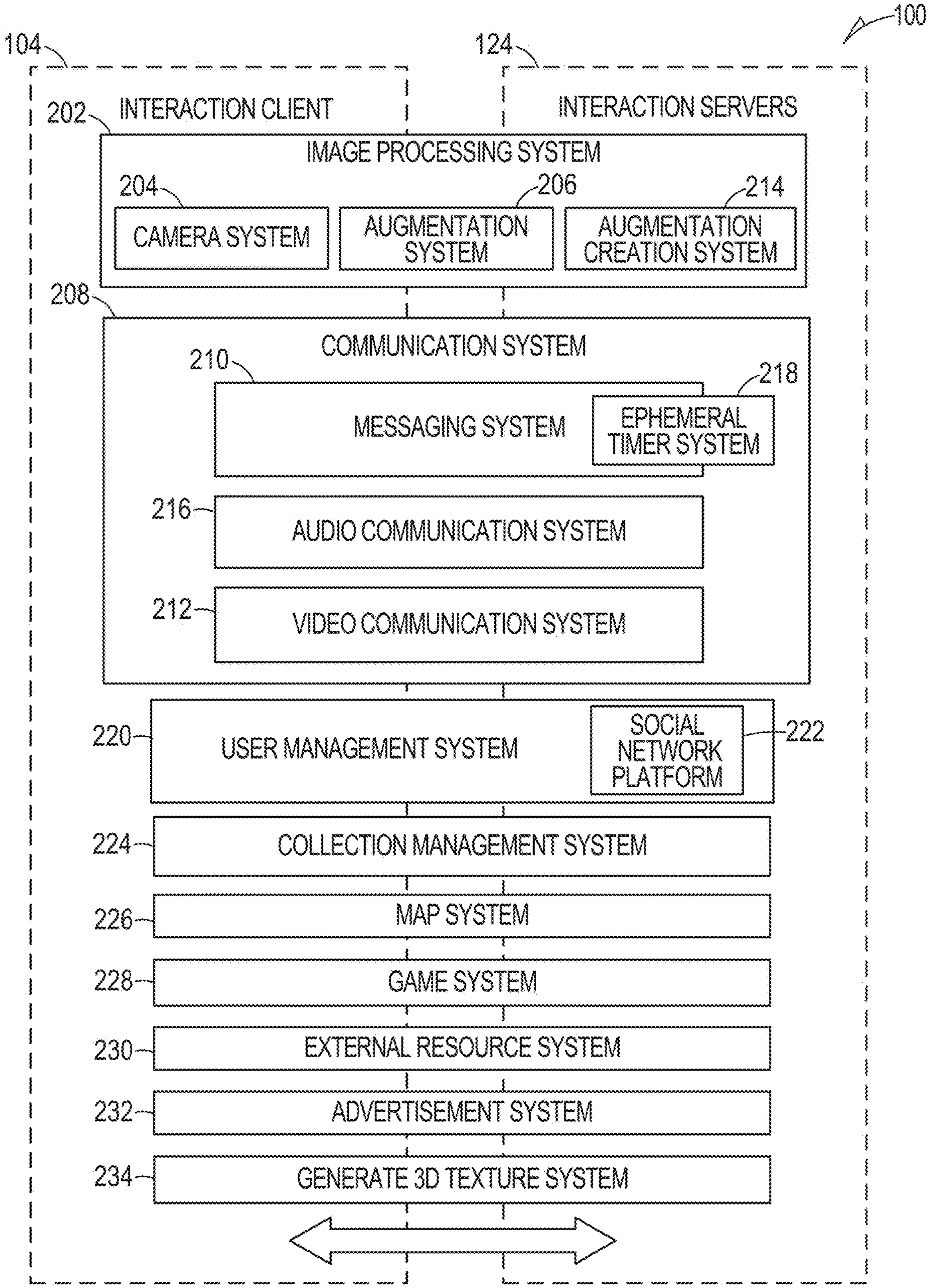
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 506 of a user system 102. These augmentations are selected by the augmentation system 206 and presented to a user of an interaction client 104, based on a number of inputs and data, such as for example:

- Geolocation of the user system 102; and
- Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an interaction platform that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Figure 8:
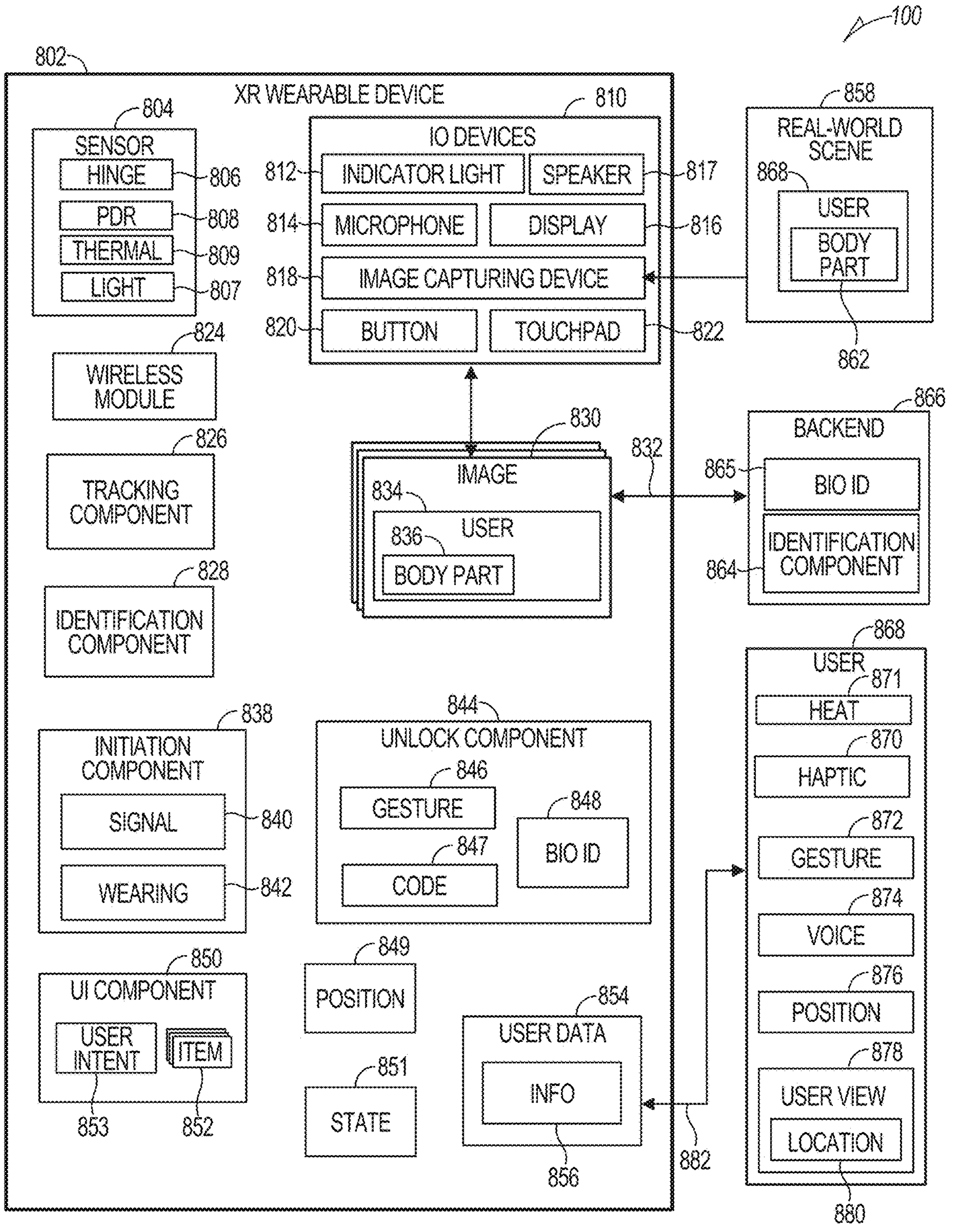
FIG. 8 illustrates a system for unlocking an XR wearable device, in accordance with some examples.

The unlock system 234 supports or is similar to the unlock component 844 of FIG. 8. In some examples, the unlock system 234 performs one or more functions for the unlock component 844, the tracking component 826, and/or the identification component 828. The unlock system 234 interacts with the interaction platform 222 by providing services such as providing the user account from the user data 854 to the interaction platform 222.

Data Architecture

Figure 3:
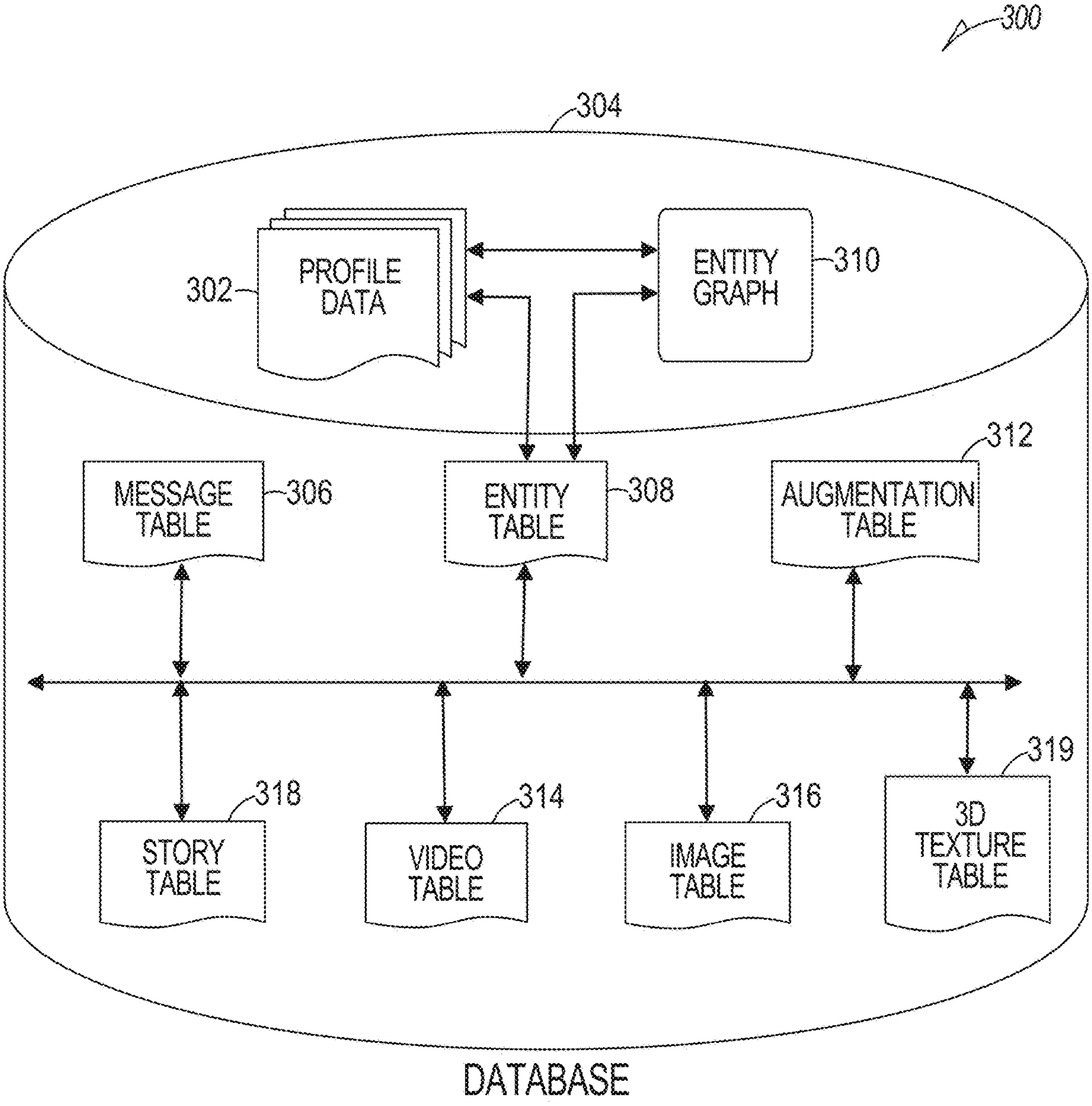
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes unlock table 319. The unlock table 319 includes, referring to FIG. 8, gestures 846, codes 847, BIO IDs 848, and so forth. The XR wearable device 802 may retrieve gestures 846, codes 847, and/or the BIO IDs 848 in authenticating users 868.

System with Head-Wearable Apparatus

Figure 4:
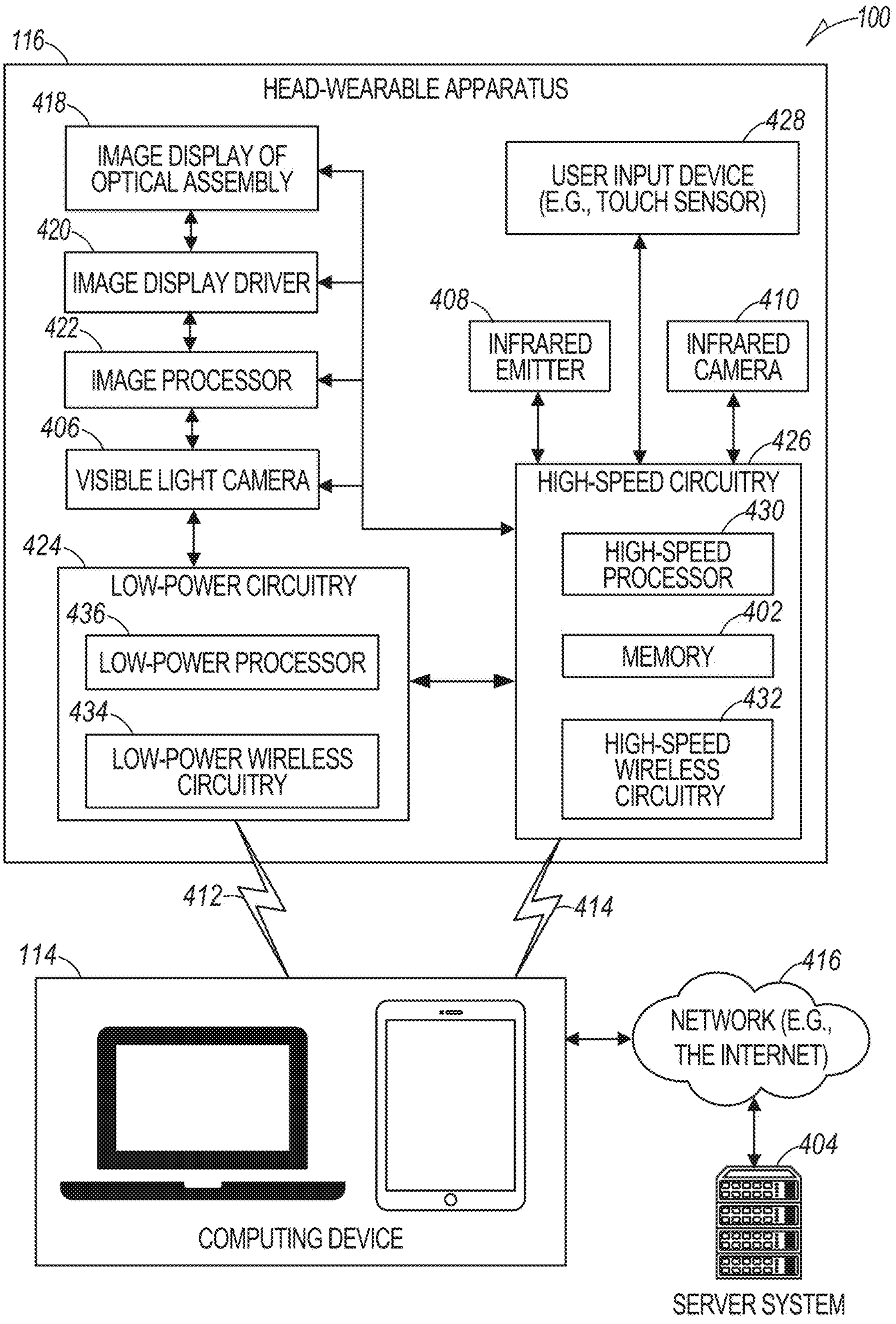
FIG. 4 is a diagrammatic representation of a message, according to some examples.

FIG. 4 illustrates a system 400 including a head-wearable apparatus 116 with a selector input device, according to some examples. FIG. 4 is a high-level functional block diagram of an example head-wearable apparatus 116 communicatively coupled to a computing device 114 and various server systems 404 (e.g., the interaction server system 110) via various networks 108.

The head-wearable apparatus 116 includes one or more cameras, each of which may be, for example, a visible light camera 406, an infrared emitter 408, and an infrared camera 410.

The computing device 114 connects with head-wearable apparatus 116 using both a low-power wireless connection 412 and a high-speed wireless connection 414. The computing device 114 is also connected to the server system 404 and the network 416, in accordance with some examples. The computing device 114 may be a portable computing device such as a smart phone, tablet, laptop, or another type of computing device 114 such as a desktop computer, or another type of computing device 114.

The head-wearable apparatus 116 further includes two image displays of the image display of optical assembly 418. The two image displays of optical assembly 418 include one associated with the left lateral side and one associated with the right lateral side of the head-wearable apparatus 116. The head-wearable apparatus 116 also includes an image display driver 420, an image processor 422, low-power circuitry 424, and high-speed circuitry 426. The image display of optical assembly 418 is for presenting images and videos, including an image that can include a graphical user interface to a user of the head-wearable apparatus 116.

The image display driver 420 commands and controls the image display of optical assembly 418. The image display driver 420 may deliver image data directly to the image display of optical assembly 418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 428 (e.g., touch sensor or push button), including an input surface on the head-wearable apparatus 116. The user input device 428 (e.g., touch sensor or push button) is to receive from the user an input selection to manipulate the graphical user interface of the presented image.

The components shown in FIG. 4 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 402, which stores instructions to perform a subset or all of the functions described herein. The memory 402 can also include storage device.

As shown in FIG. 4, the high-speed circuitry 426 includes a high-speed processor 430, a memory 402, and high-speed wireless circuitry 432. In some examples, the image display driver 420 is coupled to the high-speed circuitry 426 and operated by the high-speed processor 430 in order to drive the left and right image displays of the image display of optical assembly 418. The high-speed processor 430 may be any processor capable of managing high-speed communications and operation of any general computing system needed for the head-wearable apparatus 116. The high-speed processor 430 includes processing resources needed for managing high-speed data transfers on a high-speed wireless connection 414 to a wireless local area network (WLAN) using the high-speed wireless circuitry 432. In certain examples, the high-speed processor 430 executes an operating system such as a LINUX operating system or other such operating system of the head-wearable apparatus 116, and the operating system is stored in the memory 402 for execution. In addition to any other responsibilities, the high-speed processor 430 executing a software architecture for the head-wearable apparatus 116 is used to manage data transfers with high-speed wireless circuitry 432. In certain examples, the high-speed wireless circuitry 432 is configured to implement Institute of Electrical and Electronic Engineers (IEEE) 802.11 communication standards, also referred to herein as WiFi. In some examples, other high-speed communications standards may be implemented by the high-speed wireless circuitry 432.

The low-power wireless circuitry 434 and the high-speed wireless circuitry 432 of the head-wearable apparatus 116 can include short-range transceivers (Bluetooth™) and wireless wide, local, or wide area network transceivers (e.g., cellular or WiFi). Computing device 114, including the transceivers communicating via the low-power wireless connection 412 and the high-speed wireless connection 414, may be implemented using details of the architecture of the head-wearable apparatus 116, as can other elements of the network 416.

The memory 402 includes any storage device capable of storing various data and applications, including, among other things, camera data generated by the left and right visible light cameras 406, the infrared camera 410, and the image processor 422, as well as images generated for display by the image display driver 420 on the image displays of the image display of optical assembly 418. While the memory 402 is shown as integrated with high-speed circuitry 426, in some examples, the memory 402 may be an independent standalone element of the head-wearable apparatus 116. In certain such examples, electrical routing lines may provide a connection through a chip that includes the high-speed processor 430 from the image processor 422 or the low-power processor 436 to the memory 402. In some examples, the high-speed processor 430 may manage addressing of the memory 402 such that the low-power processor 436 will boot the high-speed processor 430 any time that a read or write operation involving memory 402 is needed.

As shown in FIG. 4, the low-power processor 436 or high-speed processor 430 of the head-wearable apparatus 116 can be coupled to the camera (visible light camera 406, infrared emitter 408, or infrared camera 410), the image display driver 420, the user input device 428 (e.g., touch sensor or push button), and the memory 402.

The head-wearable apparatus 116 is connected to a host computer. For example, the head-wearable apparatus 116 is paired with the computing device 114 via the high-speed wireless connection 414 or connected to the server system 404 via the network 416. The server system 404 may be one or more computing devices as part of a service or network computing system, for example, that includes a processor, a memory, and network communication interface to communicate over the network 416 with the computing device 114 and the head-wearable apparatus 116.

The computing device 114 includes a processor and a network communication interface coupled to the processor. The network communication interface allows for communication over the network 416, low-power wireless connection 412, or high-speed wireless connection 414. Computing device 114 can further store at least portions of the instructions for generating binaural audio content in the computing device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 420. The output components of the head-wearable apparatus 116 further include acoustic components (e.g., speakers), haptic components (e.g., a vibratory motor), other signal generators, and so forth. The input components of the head-wearable apparatus 116, the computing device 114, and server system 404, such as the user input device 428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 412 and high-speed wireless connection 414 from the computing device 114 via the low-power wireless circuitry 434 or high-speed wireless circuitry 432.

Machine Architecture

Figure 5:
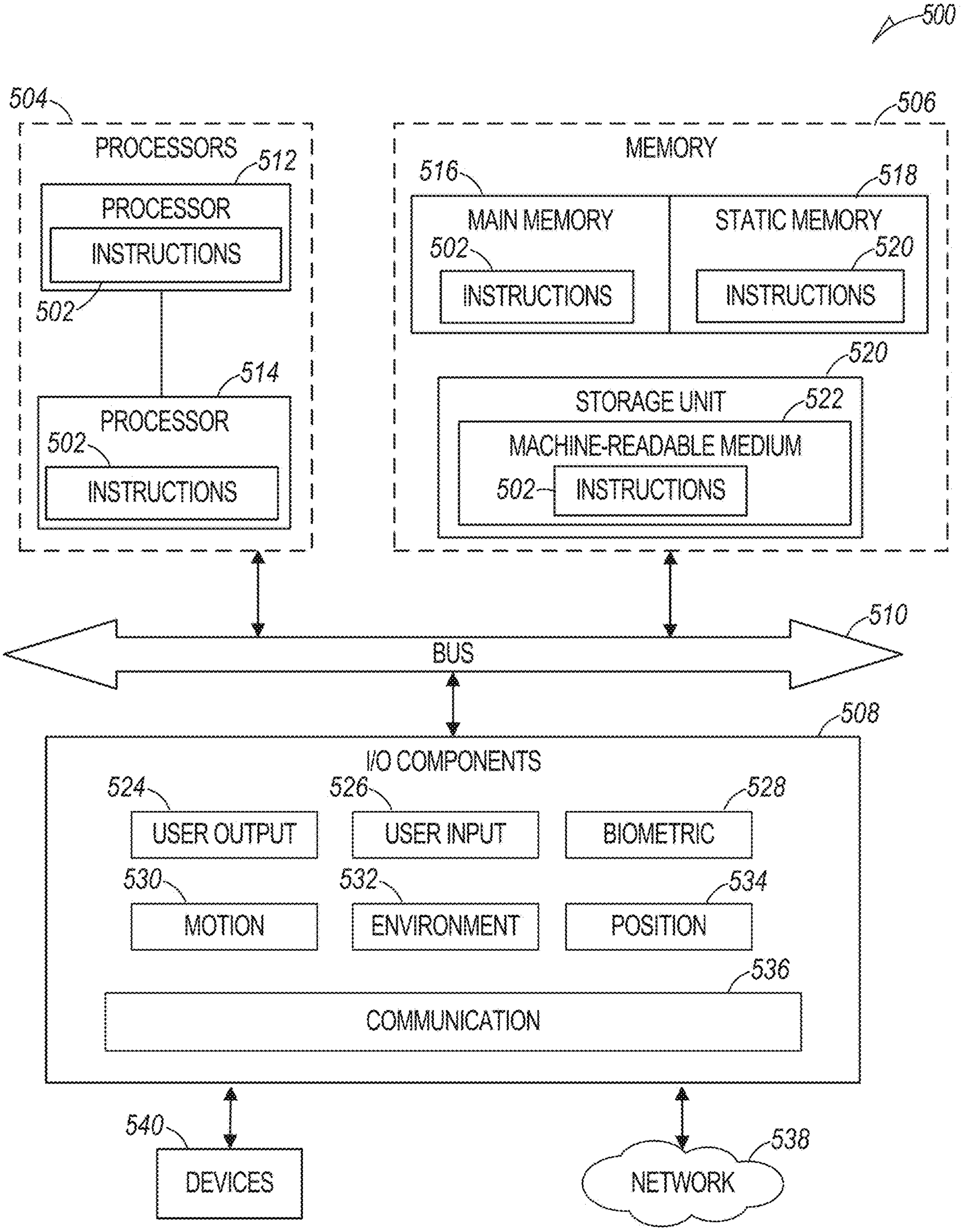
FIG. 5 illustrates a system in which the head-wearable apparatus, according to some examples.

FIG. 5 is a diagrammatic representation of the machine 500 within which instructions 502 (e.g., software, a program, an application, an applet, an app, or other executable code) for causing the machine 500 to perform any one or more of the methodologies discussed herein may be executed. For example, the instructions 502 may cause the machine 500 to execute any one or more of the methods described herein. The instructions 502 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, may comprise the user system 102 or any one of multiple server devices forming part of the interaction server system 110. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 508, which may be configured to communicate with each other via a bus 510. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that execute the instructions 502. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 516, a static memory 518, and a storage unit 520, both accessible to the processors 504 via the bus 510. The main memory 506, the static memory 518, and storage unit 520 store the instructions 502 embodying any one or more of the methodologies or functions described herein. The instructions 502 may also reside, completely or partially, within the main memory 516, within the static memory 518, within machine-readable medium 522 within the storage unit 520, within at least one of the processors 504 (e.g., within the processor's cache memory), or any suitable combination thereof, during execution thereof by the machine 500.

The I/O components 508 may include a wide variety of components to receive input, provide output, produce output, transmit information, exchange information, capture measurements, and so on. The specific I/O components 508 that are included in a particular machine will depend on the type of machine. For example, portable machines such as mobile phones may include a touch input device or other such input mechanisms, while a headless server machine will likely not include such a touch input device. It will be appreciated that the I/O components 508 may include many other components that are not shown in FIG. 5. In various examples, the I/O components 508 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 508 may include biometric components 528, motion components 530, environmental components 532, or position components 534, among a wide array of other components. For example, the biometric components 528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 508 further include communication components 536 operable to couple the machine 500 to a network 538 or devices 540 via respective coupling or connections. For example, the communication components 536 may include a network interface component or another suitable device to interface with the network 538. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 540 may be another machine or any of a wide variety of peripheral devices (e.g., a peripheral device coupled via a USB).

Moreover, the communication components 536 may detect identifiers or include components operable to detect identifiers. For example, the communication components 536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 516, static memory 518, and memory of the processors 504) and storage unit 520 may store one or more sets of instructions and data structures (e.g., software) embodying or used by any one or more of the methodologies or functions described herein. These instructions (e.g., the instructions 502), when executed by processors 504, cause various operations to implement the disclosed examples.

The instructions 502 may be transmitted or received over the network 538, using a transmission medium, via a network interface device (e.g., a network interface component included in the communication components 536) and using any one of several well-known transfer protocols (e.g., hypertext transfer protocol (HTTP)). Similarly, the instructions 502 may be transmitted or received using a transmission medium via a coupling (e.g., a peer-to-peer coupling) to the devices 540.

Software Architecture

Figure 6:
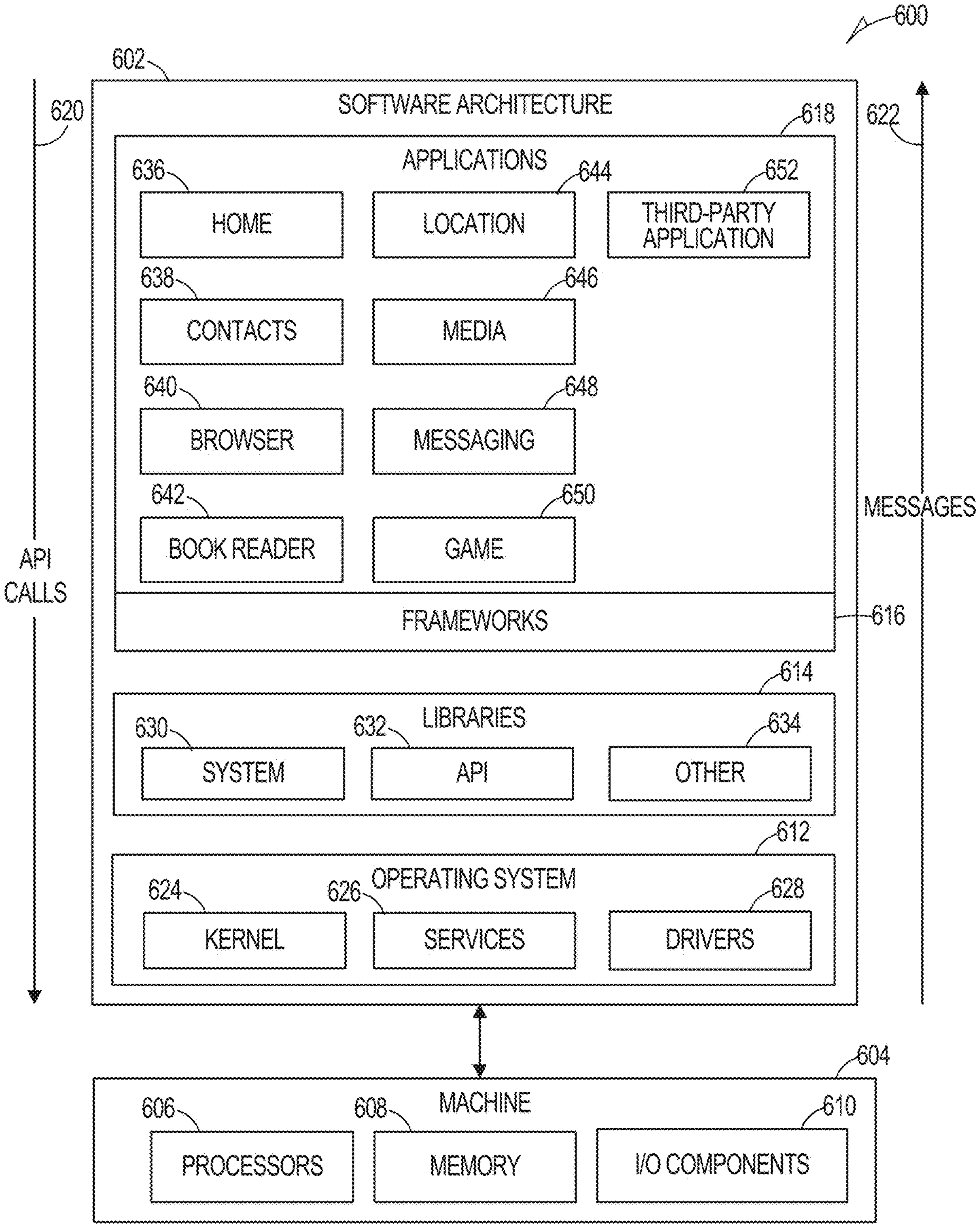
FIG. 6 is a diagrammatic representation of a machine in the form of a computer system within which a set of instructions may be executed to cause the machine to perform any one or more of the methodologies discussed herein, according to some examples.

FIG. 6 is a block diagram 600 illustrating a software architecture 602, which can be installed on any one or more of the devices described herein. The software architecture 602 is supported by hardware such as a machine 604 that includes processors 606, memory 608, and I/O components 610. In this example, the software architecture 602 can be conceptualized as a stack of layers, where each layer provides a particular functionality. The software architecture 602 includes layers such as an operating system 612, libraries 614, frameworks 616, and applications 618. Operationally, the applications 618 invoke API calls 620 through the software stack and receive messages 622 in response to the API calls 620.

The operating system 612 manages hardware resources and provides common services. The operating system 612 includes, for example, a kernel 624, services 626, and drivers 628. The kernel 624 acts as an abstraction layer between the hardware and the other software layers. For example, the kernel 624 provides memory management, processor management (e.g., scheduling), component management, networking, and security settings, among other functionalities. The services 626 can provide other common services for the other software layers. The drivers 628 are responsible for controlling or interfacing with the underlying hardware. For instance, the drivers 628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 614 provide a common low-level infrastructure used by the applications 618. The libraries 614 can include system libraries 630 (e.g., C standard library) that provide functions such as memory allocation functions, string manipulation functions, mathematic functions, and the like. In addition, the libraries 614 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 614 can also include a wide variety of other libraries 634 to provide many other APIs to the applications 618.

The frameworks 616 provide a common high-level infrastructure that is used by the applications 618. For example, the frameworks 616 provide various graphical user interface (GUI) functions, high-level resource management, and high-level location services. The frameworks 616 can provide a broad spectrum of other APIs that can be used by the applications 618, some of which may be specific to a particular operating system or platform.

In an example, the applications 618 may include a home application 636, a contacts application 638, a browser application 640, a book reader application 642, a location application 644, a media application 646, a messaging application 648, a game application 650, and a broad assortment of other applications such as a third-party application 652. The applications 618 are programs that execute functions defined in the programs. Various programming languages can be employed to create one or more of the applications 618, structured in a variety of manners, such as object-oriented programming languages (e.g., Objective-C, Java, or C++) or procedural programming languages (e.g., C or assembly language). In a specific example, the third-party application 652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 652 can invoke the API calls 620 provided by the operating system 612 to facilitate functionalities described herein.

Figure 7:
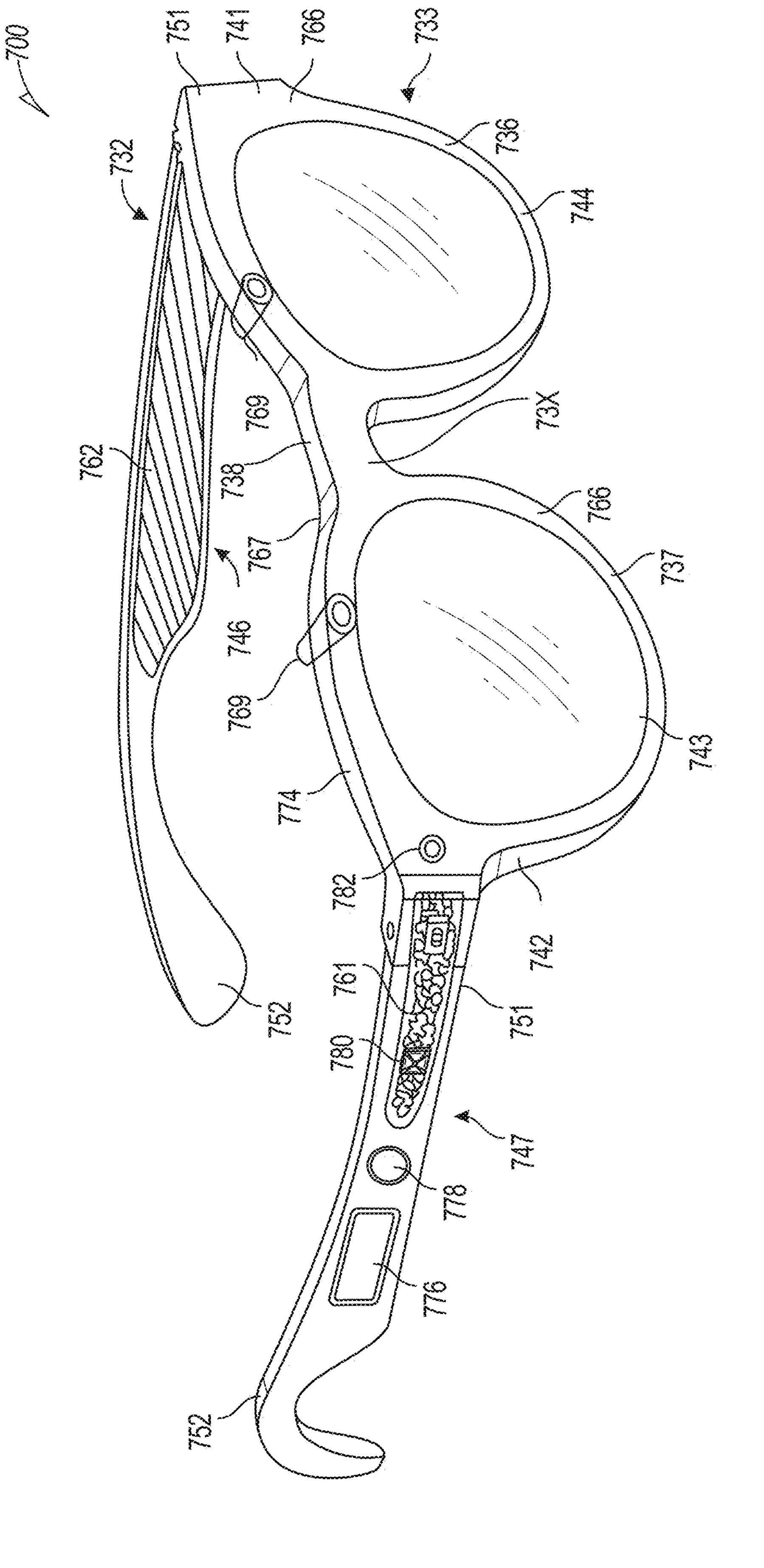
FIG. 7 is a block diagram showing a software architecture within which examples may be implemented.

FIG. 7 is a perspective view of a head-wearable apparatus in the form of glasses 700, in accordance with some examples. The glasses 700 are an article of eyewear including electronics, which operate within a network system for communicating image and video content. FIG. 7 illustrates an example of the head-wearable apparatus 116. In some examples, the wearable electronic device is termed augmented reality (AR), mixed reality (MR), virtual reality (VR), and/or extended reality (XR) glasses. The glasses 700 can include a frame 732 made from any suitable material such as plastic or metal, including any suitable shape memory alloy. The frame 732 can have a front piece 733 that can include a first or left lens, display, or optical element holder 736 and a second or right lens, display, or optical element holder 737 connected by a bridge 738. The front piece 733 additionally includes a left end portion 741 and a right end portion 742. A first or left optical element 744 and a second or right optical element 743 can be provided within respective left and right optical element holders 736, 737. Each of the optical elements 743, 744 can be a lens, a display, a display assembly, or a combination of the foregoing. In some examples, for example, the glasses 700 are provided with an integrated near-eye display mechanism that enables, for example, display to the user of preview images for visual media captured by cameras 769 of the glasses 700.

The frame 732 additionally includes a left arm or temple piece 746 and a right arm or temple piece 747 coupled to the respective left and right end portions 741, 742 of the front piece 733 by any suitable means such as a hinge (not shown), so as to be coupled to the front piece 733, or rigidly or fixedly secured to the front piece 733 so as to be integral with the front piece 733. Each of the temple pieces 746 and 747 can include a first portion 751 that is coupled to the respective end portion 741 or 742 of the front piece 733 and any suitable second portion 752, such as a curved or arcuate piece, for coupling to the ear of the user. In one example, the front piece 733 can be formed from a single piece of material, so as to have a unitary or integral construction. In one example, the entire frame 732 can be formed from a single piece of material so as to have a unitary or integral construction.

The glasses 700 include a computing device, such as a computer 761, which can be of any suitable type so as to be carried by the frame 732 and, in one example, of a suitable size and shape, so as to be at least partially disposed in one or more of the temple pieces 746 and 747. In one example, the computer 761 has a size and shape similar to the size and shape of one of the temple pieces 746, 747 and is thus disposed almost entirely if not entirely within the structure and confines of such temple pieces 746 and 747.

In one example, the computer 761 can be disposed in both of the temple pieces 746, 747. The computer 761 can include one or more processors with memory, wireless communication circuitry, and a power source. The computer 761 comprises low-power circuitry, high-speed circuitry, location circuitry, and a display processor. Various other examples may include these elements in different configurations or integrated together in different ways. Additional details of aspects of the computer 761 may be implemented as described with reference to the description that follows.

The computer 761 additionally includes a battery 762 or other suitable portable power supply. In one example, the battery 762 is disposed in one of the temple pieces 746 or 747. In the glasses 700 shown in FIG. 7, the battery 762 is shown as being disposed in the left temple piece 746 and electrically coupled using a connection 774 to the remainder of the computer 761 disposed in the right temple piece 747. One or more input and output devices can include a connector or port (not shown) suitable for charging a battery 762 accessible from the outside of the frame 732, a wireless receiver, transmitter, or transceiver (not shown), or a combination of such devices.

The glasses 700 include digital cameras 769. Although two cameras 769 are depicted, other examples contemplate the use of a single or additional (i.e., more than two) cameras 769. For ease of description, various features relating to the cameras 769 will be described further with reference to only a single camera 769, but it will be appreciated that these features can apply, in suitable examples, to both cameras 769.

In various examples, the glasses 700 may include any number of input sensors or peripheral devices in addition to the cameras 769. The front piece 733 is provided with an outward-facing, forward-facing, front, or outer surface 766 that faces forward or away from the user when the glasses 700 are mounted on the face of the user, and an opposite inward-facing, rearward-facing, rear, or inner surface 767 that faces the face of the user when the glasses 700 are mounted on the face of the user. Such sensors can include inward-facing video sensors or digital imaging modules such as cameras 769 that can be mounted on or provided within the inner surface 767 of the front piece 733 or elsewhere on the frame 732 so as to be facing the user, and outward-facing video sensors or digital imaging modules such as the cameras 769 that can be mounted on or provided with the outer surface 766 of the front piece 733 or elsewhere on the frame 732 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 743, 744 (or lenses) to provide a mixed reality or augmented reality experience for the user of the glasses 700.

The glasses 700 further include an example of a camera control mechanism or user input mechanism comprising a camera control button mounted on the frame 732 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 732 adjacent to its surface for detecting the presence of a user's finger, to dispose the touch-sensitive button to the engaged condition when the user touches a finger to the corresponding spot on the outer surface 766 of the frame 732. It will be appreciated that the above-described camera control button and capacitive touch button are but two examples of a haptic input mechanism for single-action control of the camera 769, and that other examples may employ different single-action haptic control arrangements.

The computer 761 is configured to perform the methods described herein. In some examples, the computer 761 is coupled to one or more antennas for reception of signals from a GNSS and circuitry for processing the signals where the antennas and circuitry are housed in the glasses 700. In some examples, the computer 761 is coupled to one or more wireless antennas and circuitry for transmitting and receiving wireless signals where the antennas and circuitry are housed in the glasses 700. In some examples, there are multiple sets of antennas and circuitry housed in the glasses 700. In some examples, the antennas and circuitry are configured to operate in accordance with a communication protocol such as Bluetooth™, Low-energy Bluetooth™, IEEE 802, IEEE 802.11az/be, WiFI®, and so forth. In some examples, PDR sensors housed in glasses 700 and coupled to the computer 761. In some examples, the glasses 700 are VR headsets where optical elements 743, 744 are opaque screens for displaying images to a user of the VR headset. In some examples, the computer 761 is coupled to user interface elements such as slide or touchpad 776 and button 778. A long press of button 778 resets the glasses 700. The slide or touchpad 776 and button 778 are used for a user to provide input to the computer 761 and/or other electronic components of the glasses 700. The glasses 700 include one or more microphones 782 that are coupled to the computer 761. The glasses 700 include one or more gyroscopes 780.

Unlocking XR Glasses

FIG. 8 illustrates a system 800 for unlocking an XR wearable device, in accordance with some examples. The system 800 includes an XR wearable device 802 such as glasses 700 of FIG. 7 or head-wearable apparatus 116 of FIGS. 1 and 4. The XR wearable device 802 may be augmented reality (AR), mixed reality (MR), virtual reality (VR), and/or extended reality (XR) glasses.

Figure 9:
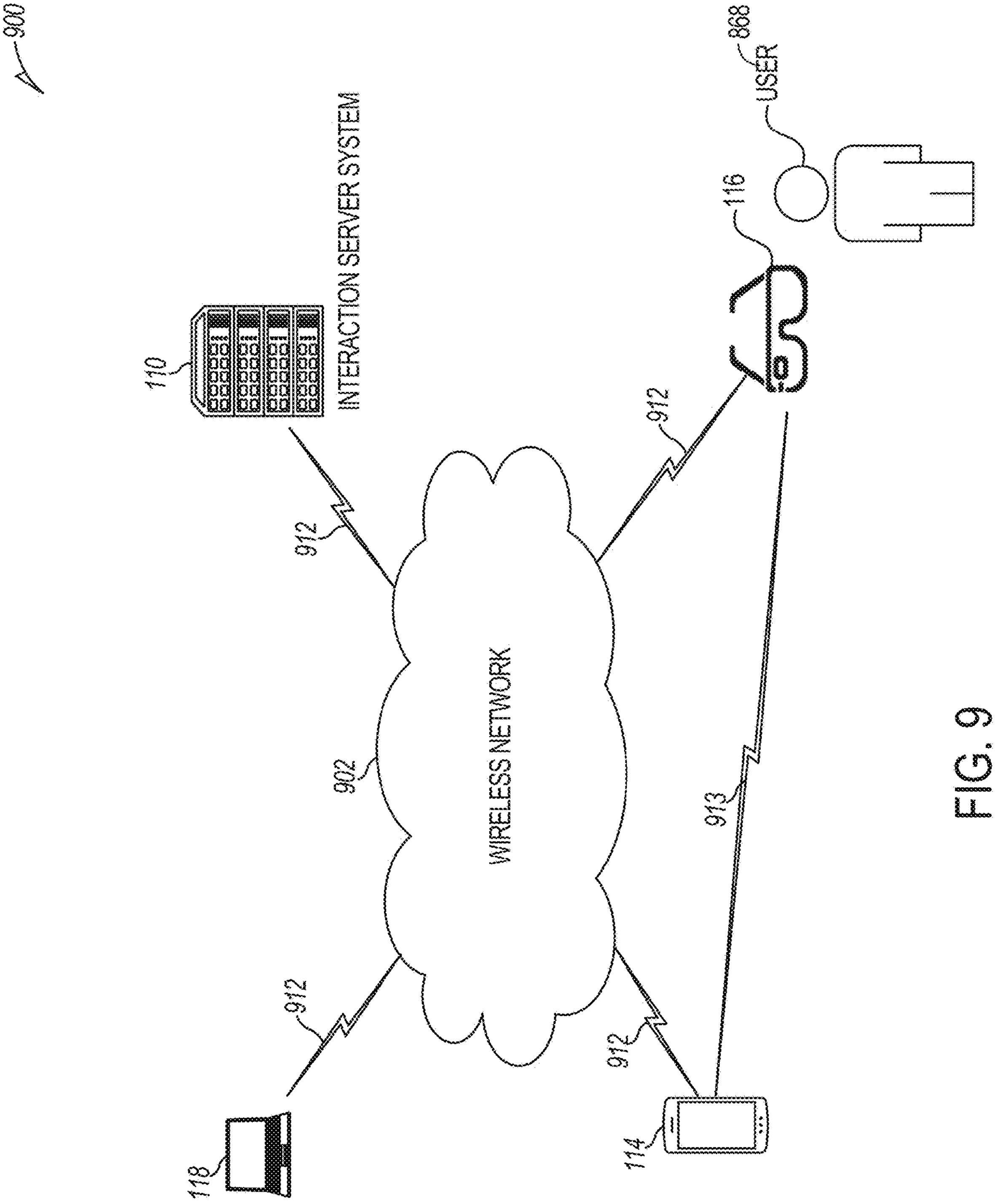
FIG. 9 is a schematic diagram illustrating a system for an XR wearable device 802, in accordance with some examples.

The system 800 includes the XR wearable device 802, real-world scene 858, which is the real-world with which the user 868 and XR wearable device 802 interact, backend 866, and user 868, which is the user 868 of the XR wearable device 802. The real-world scene 858 may include the user 868 and a body part 862 of the user 868. The backend 866, referring to FIG. 9, is another computing device such as the interaction server system 110, the computer client device 118, or the computing device 114. The initiation component 838 identifies an intent from the user 868 to unlock the XR wearable device 802. The unlock component 844 securely unlocks the XR wearable device 802. A user who is authorized to use the XR wearable device 802 may be termed an authorized user 868.

The input/output (IO) devices 810 include devices that enable a user 868 to provide input or receive output from the XR wearable device 802. The IO devices 810 include an indicator light 812, microphone 814, a display 816, a speaker 817, an image capturing device 818, a button 820, a touchpad 822, a gyroscope (not illustrated), a vibrating device (not illustrated), and so forth.

The image capturing device 818 captures the image 830 of the real-world scene 858, which is a front facing view from the user view 878 and is what the user 868 sees through the XR wearable device 802, in accordance with some examples. For example, the user 868 may look through the optical elements 743, 744 (or lenses) of FIG. 7 to see the user view 878 of the real-world scene 858. In some examples, there are multiple image capturing devices 818, which include an image capturing device 818 facing towards the face of the user 868. The location 880 is a location of the user 868. In some examples, the location 880 is in three-dimensional (3D) coordinates within a 3D world coordinate system that indicates a location of the user view 878. The image capturing device 818 may be a charged-coupled device (CCD) or another type of device to capture an image of the real-world scene 858. An example of a button 820 is button 778 of FIG. 7. An example of the touchpad 822 is touchpad 776. The button 778 and touchpad 776 enable the user 868 to provide haptic 870 input. The microphone 814 enables the user 868 to provide voice 874 input. The image capturing device 818 enables the user 868 to provide gesture 872 input. The thermal 809 sensor enables the user 868 to provide heat 871 as an input.

The sensors 804 include a gyroscope, light 807 sensor, a pedestrian dead reckoning (PDR) 808 sensor, a hinge 806 sensor, a thermal 809 sensor, a clock, and so forth. An example gyroscope is gyroscope 780 of FIG. 7. In some examples, the PDR 808 sensor provides position 849 data that can be used to detect motion of the XR wearable device 802. When the PDR 808 sensor detects motion, a signal is sent to the initiation component 838.

Some devices such as the PDR 808 can be both a sensor 804 and an IO device 810. For example, the user 868 may move the XR wearable device 802, which changes the position 849 of the XR wearable device 802 and communicates input to the XR wearable device 802. The position 876 of the user 868 is assumed to be the same as the XR wearable device 802 when the user 868 is wearing the XR wearable device 802, in accordance with some examples. The XR wearable device 802 detects the change in position 849 based on signals from the PDR 808. The movement may have a user intent 853 to initiate unlocking the XR wearable device 802. In some examples, the user 868 moving the XR wearable device 802 in a specific pattern initiates the unlocking process by powering up one or more components of the XR wearable device 802. For example, the XR wearable device 802 may have an electronic component, which does not need to be continuously powered, that generates a signal if the XR wearable device 802 is shaken. The signal may awaken the initiation component 838. However, the user 868 may move with the XR wearable device 802 without a user intent 853 to communicate input to the XR wearable device 802.

The wireless module 824 communicates 832 between the backend 866 and the XR wearable device 802. The wireless module 824 is configured to perform wireless communication protocols with the backend 866. The communication protocols may include LE Bluetooth (BLE), Institute for Electrical and Electronic Engineers (IEEE) 802.11 communication protocols, proprietary communications protocols, 3GPP communication protocols, and so forth. The wireless module 824 sets up a wireless communication link between the XR wearable device 802 and the backend 866. For example, the wireless module 824 associates with a corresponding wireless module on the backend 866. The wireless module 824 may communicate with the backend 866 via one or more intermediate devices such as a computing device 114, which may also be the backend 866, an access point, or a node B. In some examples, the wireless module 824 can be used to determine a location and/or an orientation of the XR wearable device 802 with the assistance of other wireless devices.

The user data 854 is data that is related to the user 868 and may be input 882 from the user 868. The information (info) 856 includes input data from the user 868 and may include additional information about the user 868 such as a social media account to log onto the interaction platform 222, a username, and so forth.

The state 851 is stored in a memory of the XR wearable device 802 and indicates a state of the XR wearable device 802 such as locked, unlocked, sleeping, awake, and so forth. In some examples, there is not an explicit state 851 but the XR wearable device 802 has a state based on the state of the various components. In some examples, the XR wearable device 802 has a power distribution system that enables selective components to receive power while not powering other components. For example, the initiation component 838 may be a separate component that receives power continuous and determines whether to initiate the unlocking process.

The initiation component 838 determines whether to invoke the unlock component 844. The XR wearable device 802 may be in a state 851 of sleeping. The initiation component 838 determines whether to wake up the XR wearable device 802 and provide the user 868 with the opportunity to unlock the XR wearable device 802. The initiation component 838 may turn on the indicator light 812 to inform the user 868 that the unlock process has been initiated. In some examples, to save battery power, the initiation component 838 is processing circuitry that receives signals 840 from the sensors 804 and/or the IO devices 810 and determines whether the signals 840 indicate the XR wearable device 802 or portions of the XR wearable device 802 should be awakened to enable the user 868 to unlock the XR wearable device 802. An example of a power saving technique is a configuration where the movement of the temple piece 747 of FIG. 7 generates a signal 840 to the initiation component 838, which powers up the initiation component 838. The hinge 806 sensor may not need to be continuously powered and may generate a signal 840 from the movement of the temple piece 747. Other sensors 804 may require minimal power to continuously monitor for a user intention 853 to unlock the XR wearable device 802 and generate a signal 840.

For example, the following may generate signals 840 that are processed by the initiation component 838. The PDR 808 may generate a signal 840 when the XR wearable device 802 is moved more than or transgresses a threshold distance, such as one or more inches. The hinge 806 sensor may generate a signal 840 when a left arm or temple piece 746 or a right arm or temple piece 747 is opened. A light 807 sensor may generate a signal 840 when light strikes the light 807 sensor. For example, the XR wearable device 802 may be kept in a case and when removed from the case the light 807 sensor may be exposed to light and generate a signal 840 to the initiation component 838. In some examples, a thermal 809 sensor may send a signal 840 to the initiation component 838 when the thermal 809 sensor senses heat from the touch of the user 868. In some examples, a case (not illustrated) may send a wireless signal to the XR wearable device 802 that the case has been opened. The wireless module 824 may then detect the wireless signal and send a signal 840 to the initiation component 838. In some examples, the user 868 may press a button 778 or provide other haptic 870 input that generates a signal 840 to the initiation component 838 to indicate an intention to unlock the XR wearable device 802.

The initiation component 838 receives a signal 840 from a source such as one of the sources described herein and the initiation component 838 determines whether to invoke the unlock component 844 to provide the user 868 with the opportunity to unlock the XR wearable device 802. The initiation component 838 may determine whether the XR wearable device 802 is being worn by the user 868. For example, the initiation component 838 may receive a signal 840 from a sensor 804 and determine that the XR wearable device 802 was merely moved and not placed on the head of the user 868.

The initiation component 838 may wait a period of time to permit the user 868 to put the XR wearable device 802 on the head of the user 868. The initiation component 838 may determine whether the user 868 is wearing 842 the XR wearable device 802 by turning on an image capturing device 818 and capturing an image 830. The initiation component 838 may then determine based on the image 830 whether the XR wearable device 802 is being worn. In some examples, the XR wearable device 802 does not have to be worn to be unlocked. In some examples, if the XR wearable device 802 was recently unlocked and used by the user 868, the unlock component 844 may use an abbreviated unlocking process such as taking an image and confirming the image is of the same user 868 who was just using the XR wearable device 802 as is described in more detail below.

The unlock component 844 is for security and identifying the user 868 so that data of the user 868 and/or accounts of the user 868 may be accessed securely. In some examples, the user 868 performs a gesture 872, which the image capturing device 818 captures in one or more images 830. The unlock component 844 identifies the user 834 within the image 830 and a body part 836 within the image 830. For example, the user 868 may make a gesture 872 of waving their hands. The tracking component 826 determines the gesture 846 was made. The unlock component 844 may determine that the gesture 846 is sufficient to unlock the XR wearable device 802 for use by the user 868. The gesture 872 may be a particular hand position such as a peace sign or an OK sign. In some examples, the user 868 can set the gesture 872 and the XR wearable device 802 stores the gesture 846. This may provide security for unlocking the XR wearable device 802.

The unlock component 844 may additionally or instead of a gesture 846 perform a biometrics identification (BIO ID) 848 of the user 868. For example, the image capturing device 818 may capture an image of a body part 836 such as a hand and the unlock component 844 matches the hand to the BIO ID 848 of the hand of the user 868. The BIO ID 848 may be based on the unique shape of the hand of the user 868, the unique pattern of whorls and lines on the hand of the user 868, or another BIO ID 848. In another example, the image capturing device 818 captures an image of the eyes of the user 868, and the BIO ID 848 is based on the unique pattern of the iris of the eye of the user 868. The body part 836 may be an ear, a hand, a finger, a thumb, an eye, a face, an arm, a leg, a torso, rearend, a foot, a toe, or another body part 836 where a BIO ID 848 may be made.

In some examples, the user 868 holds the XR wearable device 802 pointed at their face to unlock the XR wearable device 802. The initiation component 838 detects a signal to give the user 868 a chance to unlock the XR wearable device

802 and invokes the unlock component 844. The unlock component 844 causes images 830 to be captured. The unlock component 844 uses the identification component 828 to identify the user 834 and the body part 836 of eye. The unlock component 844 then matches the body part 836 of the eye with the BIO ID 848 of the eye of the user 868 to unlock the XR wearable device 802. The body part 836 may also be a finger, a thumb, or another body part 836 such as disclosed herein. The unlock component 844 may be configured to match fingerprints, thumbprints and so forth. In some examples, the unlock component 844 is configured to identify both a gesture 846 and then perform a BIO ID 848 on a body part 836. This may help prevent fraud from, for example, a printout of a fingerprint of a user 868. For example, the tracking component 826 may keep track of the body part 836 such as a finger of the user 834. The user 868 may then have to perform a gesture 846 and then the unlock component 844 performs a BIO ID 848 on the finger that performed the gesture 846.

In some examples, the unlock component 844 will use the UI component 850 to assist in unlocking the XR wearable device 802. For example, the user 868 places the XR wearable device 802 on their head. The initiation component 838 receives a signal and determines that the user 868 is to be given a chance to unlock the XR wearable device 802. The UI component 850 may display on the display 816 UI items 852 for the user 868 to select how they would like to unlock the XR wearable device 802, which may include one or more of: entering a password, capturing an image of a body part 836 for BIO ID 848, performing a gesture 846, and so forth. The UI component 850 is configured to determine a user intent 853 based on UI items 852 displayed on the display 816 of the XR wearable device 802.

In some examples, the unlock component 844 requires two or more factor identification before unlocking the XR wearable device 802. For example, the unlock component 844 may send a code to an email or ask a question of the user 868. The unlock component 844 may receive signals from the microphone 814 representing the voice 874 of the user 868 and determine whether the signals represent a code sent to the user 868 in two or more factor identification or whether the signals indicate an answer to a security question.

In some examples, an application on a user system 102 such as computing device 114 of FIGS. 1 and 9 sends a code 847 to the XR wearable device 802. The wireless module 824 receives the code 847 and sends the code 847 to the initiation component 838 and/or the unlock component 844. The unlock component 844 determines if the code 847 indicates whether the XR wearable device 802 should be unlocked. In some examples, the unlock component 844 encodes the code 847 and sends the code to the interaction service system 110, which returns an indication if the code 847 is a valid code 847. If the unlock component 844 determines the code 847 is a valid code 847, then the unlock component 844 unlocks the XR wearable device 802. In some examples, the wireless module 824 solicits the code 847. For example, the initiation component 838 may have received a wake-up signal 840 such as from the hinge 806 sensor. The initiation component 838 may then power-up the wireless module 824 and instruct the wireless module 824 to send out queries if there are nearby wireless devices that may participate in the unlocking of the XR wearable device 802. In some examples, the code 847 sent from the backend 866 such as computing device 114 indicates that the user 868 is logged into an interaction platform 222 with a username and, optionally, other identifying information. The unlock component 844 then compares the code 847 to info 856 to determine if the XR wearable device 802 is registered for or owned by the same user 868 who is logged into the interaction platform 222. The unlock component 844 may then change the state 851 to unlocked and log the XR wearable device 802 into the same account indicated into the code 847. In some examples, the user 868 may bring an object near the XR wearable device 802 that communicates using Near-field communication (NFC). The object may be a fob, a card, a computing device 114, or another electronic device. The code 847 may be received from the XR wearable device 802 via NFC. The NFC communication may be a signal 840 that wakes-up the XR wearable device 802 and/or a code 847 that is used to unlock the XR wearable device 802.

The unlock component 844, the identification component 828, tracking component 826 and so forth may send data such as an image 830 to the backend 866 for processing. For example, the body part 836 of a thumb print may be sent to the backend 866 and a BIO ID 865 may be stored on a secure server. Additionally, identifying a gesture 846 may be processing intensive so the images 830 may be sent to the backend 866 for processing by an identification component 864, which may determine whether or not the gesture 846 was performed by the user 868. In some examples, neural networks are used that are trained based on the user 868 providing information such as performing the gesture 846 a number of times or providing the BIO ID 848 a number of times. The neural network may then be stored on the backend 866 or the XR wearable device 802 and used to identify whether or not the user 868 performed the gesture 846 and/or passes the BIO ID 848.

FIG. 9 is a schematic diagram illustrating a system 900 for an XR wearable device 802, in accordance with some examples. The XR wearable device 802 communicates by sending communications 912, 913 using wireless module 824. The wireless network 702 is a cellular telephone network such as an LTE network, 3GPP, an IEEE 802.11 network, a BlueTooth® network, or another wireless network using another wireless communication protocol. In some examples, the XR wearable device 802 communicates directly with the computing device 114 where communications 913 are sent using a communication protocol such as the communication protocols discussed for the wireless network 902. The protocol for communication 913 may be different than the protocols used for the communications 912. For example, communication 913 may be BlueTooth® and the communications 912 may be 3GPP or IEEE 802.11.

In examples the XR wearable device 802 sends communications 912, 913 that includes data and/or commands or requests to another device such as the computing device 114, the interaction server system 110, or the computer client device 118. The wireless network 902 may include access to the internet and/or the XR wearable device 802 may access the internet via another connected device such as the computing device 114, which may be a smartphone.

In some examples, the interaction server system 110 provides a social networking service such as interaction platform 222 to enable communication of content such as photos, videos, status updates, media content messages, and the like, directly to social networking service such as Snapchat® from the XR wearable device 802.

One or more of the computing devices 114, the interaction server system 110, or the computer client device 118 may assist the XR wearable device 802 in processing data, providing data, and/or forwarding communications.

Figure 10:
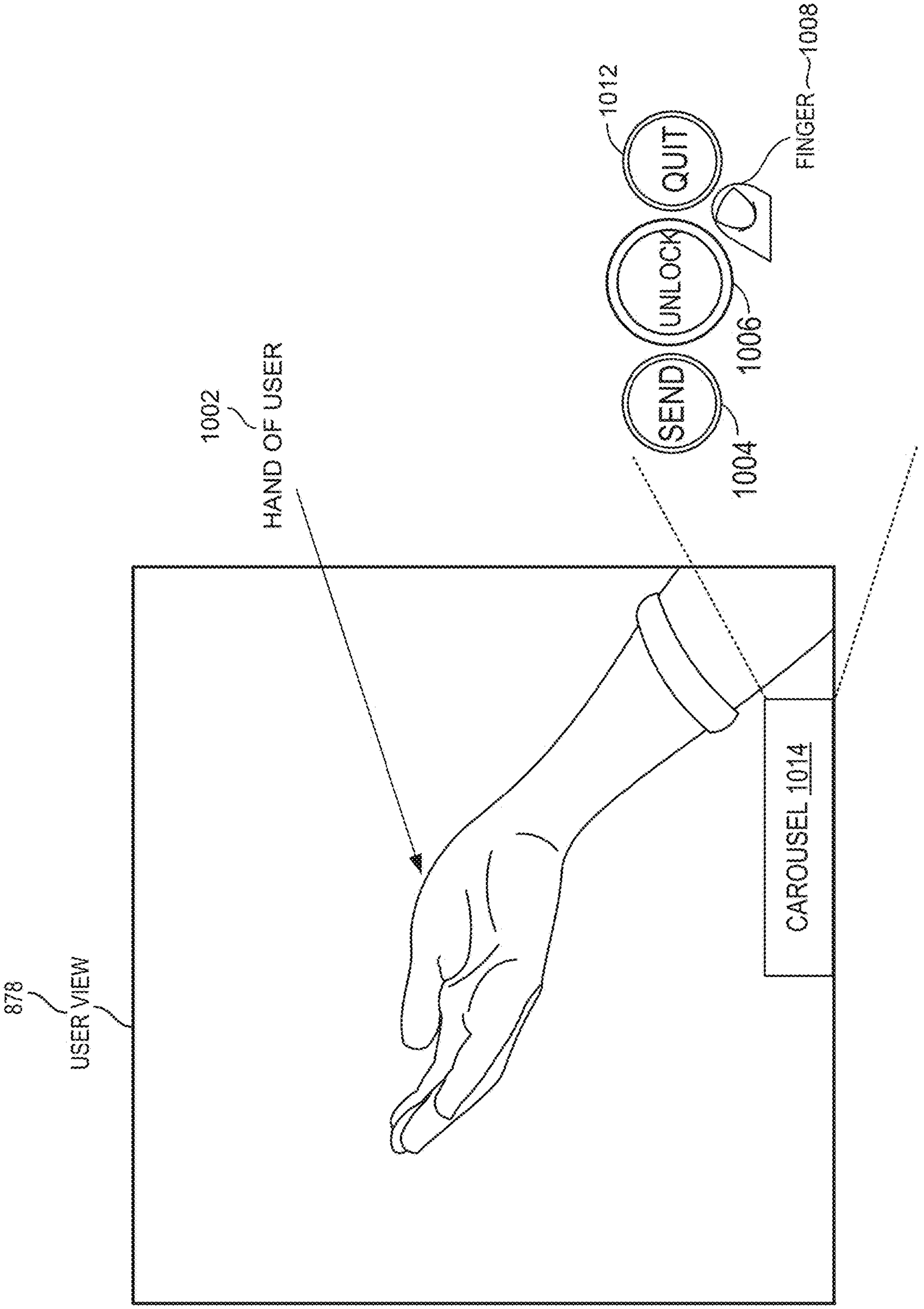
FIG. 10 illustrates unlocking an XR wearable device, in accordance with some examples.

FIG. 10 illustrates unlocking an XR wearable device 802, in accordance with some examples. Referring to FIGS. 8 and 10, the user 868 (not illustrated) sees the user view 878 through the XR wearable device 802. The initiation component 838, received a signal 840 and powered up the XR wearable device 802. The identification component 828 identifies the hand-of-user 1002 as the body part 836. The unlock component 844 identifies the hand-of-user 1002 using BIO ID 848 to determine to unlock the XR wearable device 802.

The UI component 850 displays on the display 816 the carousel 1014 comprising items 852, "send" 1004, "unlock" 1006, and "quit" 1012. The initiation component 838 and/or the unlock component 844 may have signaled to the UI component 850 to display the carousel 1014. The finger 1008 of the user 868 may select an item 852. For example, the finger 1008 may select "unlock" 1006 by hovering the finger 1008 over "unlock" 1006. Selecting "unlock" 1006 causes the unlock component 844 to use the identification component 828 to identify the hand-of-user 1002 and verify the hand-of-user 1002 with BIO ID 848. In some examples, the user 868 may have to first perform a gesture 872 such as waving the hand-of-user 1002 or forming a hand signal such as a peace sign.

The user 868 of FIG. 8 may select "send" 1004, which may cause the XR wearable device 802 to communicate with a nearby computing device 114 of the user 868. For example, the computing device 114 may send a code 847 to the XR wearable device 802, which may be in response to a request from the XR wearable device 802. The code 847 may indicate an account with which the user 868 is logged into the interaction platform 222 with the computing device 114. The code 847 is then verified by the unlock component 844, which then logs the XR wearable device 802 into the interaction platform 222 based on the code 847.

Figure 11:
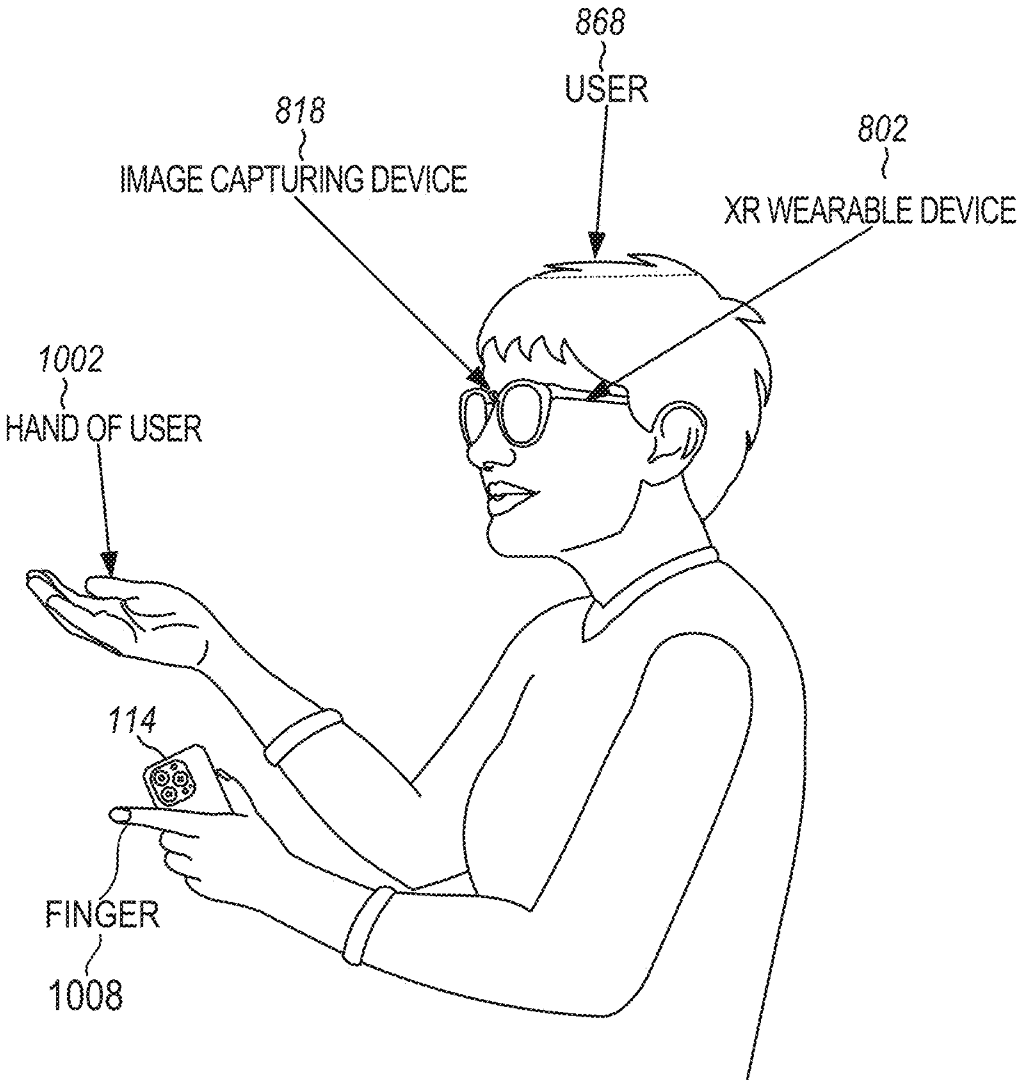
FIG. 11 illustrates unlocking an XR wearable device, in accordance with some examples.

FIG. 11 illustrates unlocking an XR wearable device 802, in accordance with some examples. FIG. 11 illustrates the situation from FIG. 10 from a different perspective. The user 868 is illustrated wearing the XR wearable device 802. The image capturing device 818 captures an image of the hand-of-user 1002. The finger 1008 of the user 868 is selecting an item 852 from the carousel 1014. The user 868 is holding the computing device 114.

Figure 12:
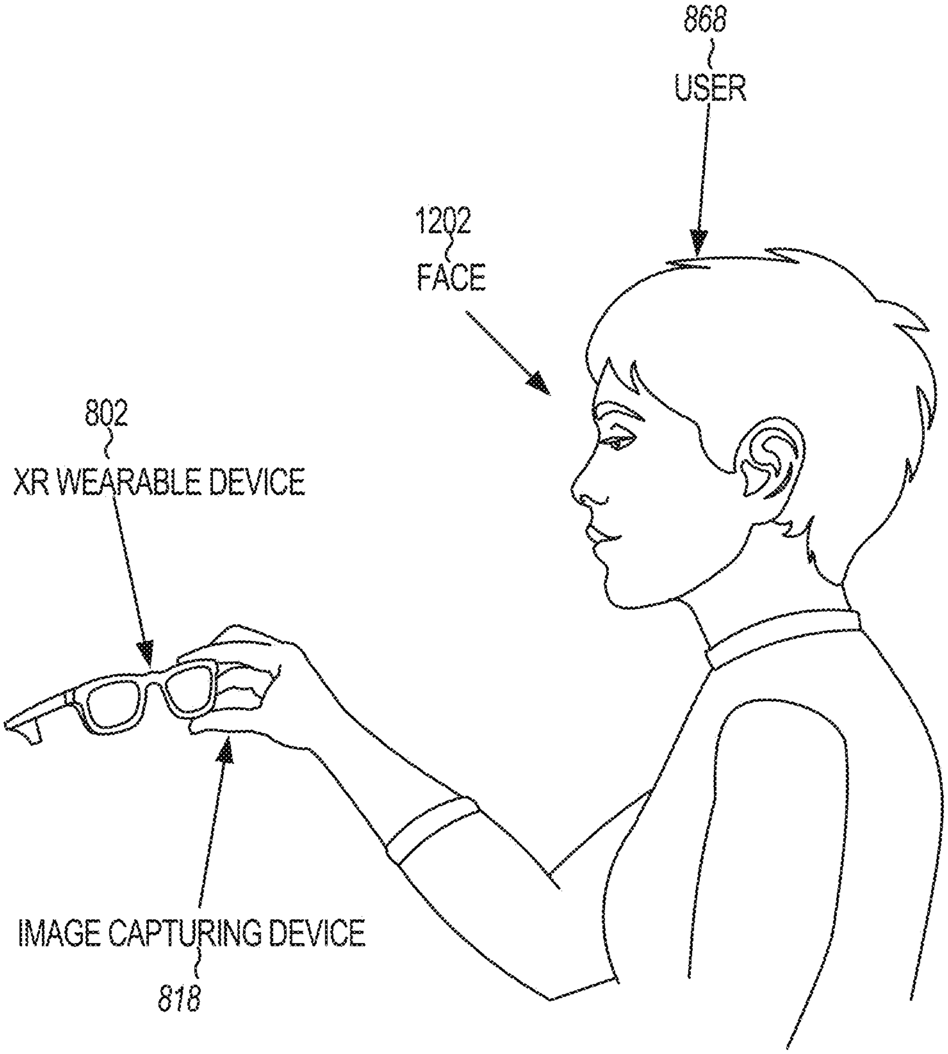
FIG. 12 illustrates unlocking an XR wearable device, in accordance with some examples.

FIG. 12 illustrates unlocking an XR wearable device 802, in accordance with some examples. Referring to FIGS. 8 and 12, the user 868 is holding the XR wearable device 802 in their hand so that the image capturing device 818 can capture the face 1202 of the user 868. The initiation component 838 has awakened the XR wearable device 802 after receiving a signal 840. The unlock component 844 identifies the body part 836 of the face 1202 and verifies the face 1202 using the BIO ID 848. If the face 1202 is verified using the BIO ID 848, then the unlock component 844 unlocks the XR wearable device 802. In some examples, the unlock component 844 requires, in addition to or instead of the image 830 of the face 1202, the user 868 to perform a gesture 872 such as smiling with their face 1202. Moreover, the unlock component 844 may require multi-factor verification by sending a code 847 to the computing device 114 and then providing a UI via the UI component 850 for the user 868 to enter or the user 868 to speak the code 847.

Figure 13:
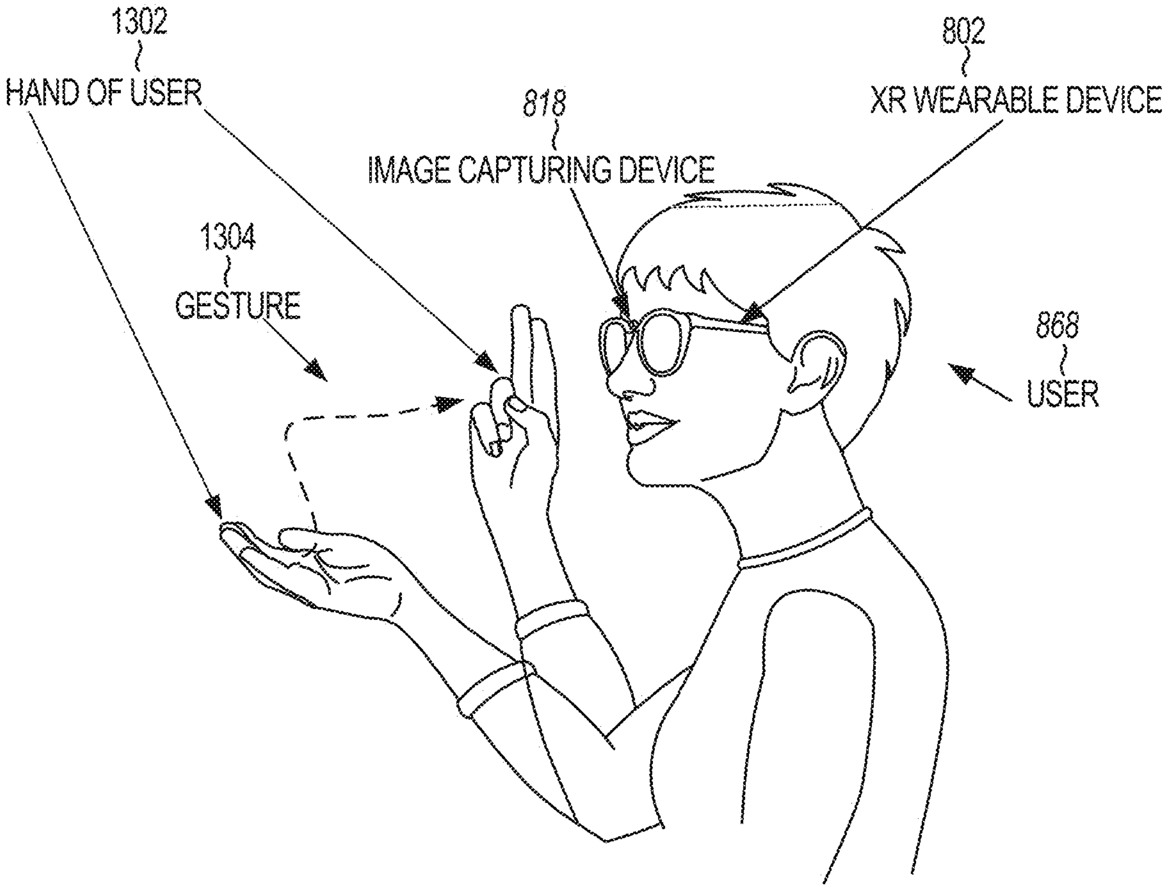
FIG. 13 illustrates unlocking an XR wearable device, in accordance with some examples.

FIG. 13 illustrates unlocking an XR wearable device 802, in accordance with some examples. The user 868 is wearing the XR wearable device 802. The user 868 is performing a gesture 1304 using the hand of user 1302. The image capturing device 818, referring to FIGS. 13 and 8, is capturing images 830. The identification component 828 identifies the hand of user 1302 as the body part 836. The unlock component 844 and/or the tracking component 826 may identify the gesture 1304. The unlock component 844 unlocks the XR wearable device 802 if the gesture 1304 matches the gesture 846. In some examples, the user 868 may input a gesture 846 to unlock the XR wearable device 802 during configuration of the XR wearable device 802. In some examples, the unlock component 844 matches the hand of user 1302 and/or the gesture 1304 with BIO ID 848 to determine if the user 868 performed the gesture 846.

Figure 14:
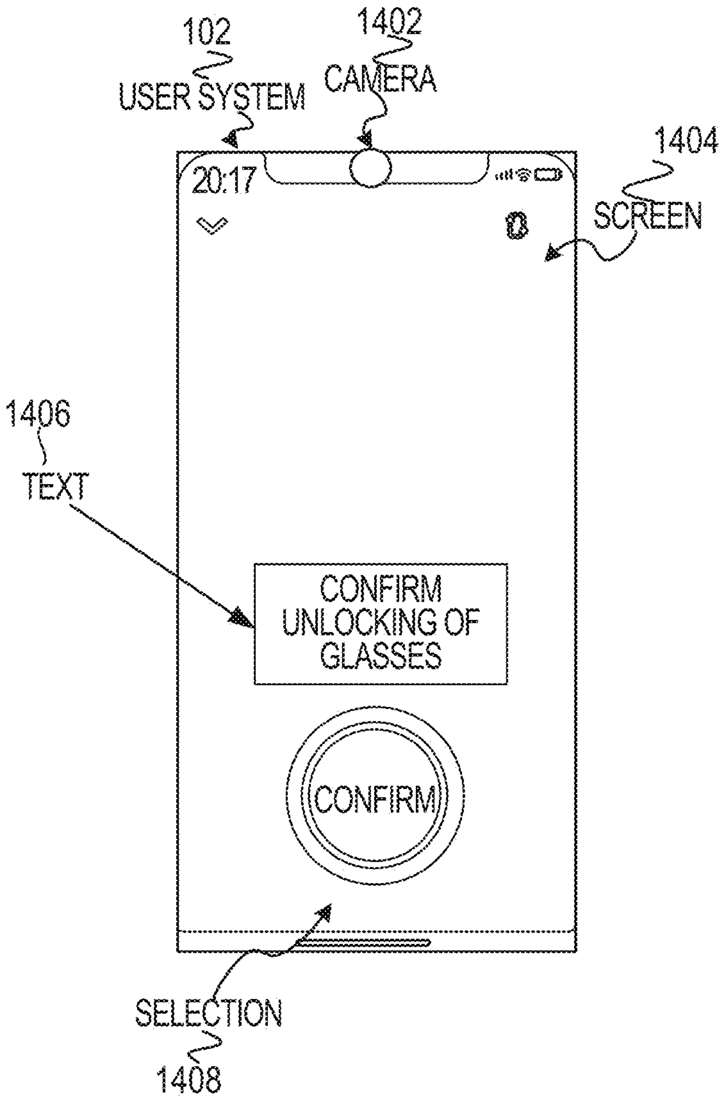
FIG. 14 illustrates unlocking an XR wearable device, in accordance with some examples.

FIG. 14 illustrates unlocking an XR wearable device, in accordance with some examples. A user system 102, which may be computing device 114, includes a camera 1402 and screen 1404. The user 868 has run an application that requires unlocking of the XR wearable device 802 of FIG. 8. The application indicates in the text 1406 that a selection 1408 of the button labeled "Confirm" will unlock the XR wearable device 802. The user system 102 sends a code 847 that causes the unlock component 844 to unlock the XR wearable device 802.

Figure 15:
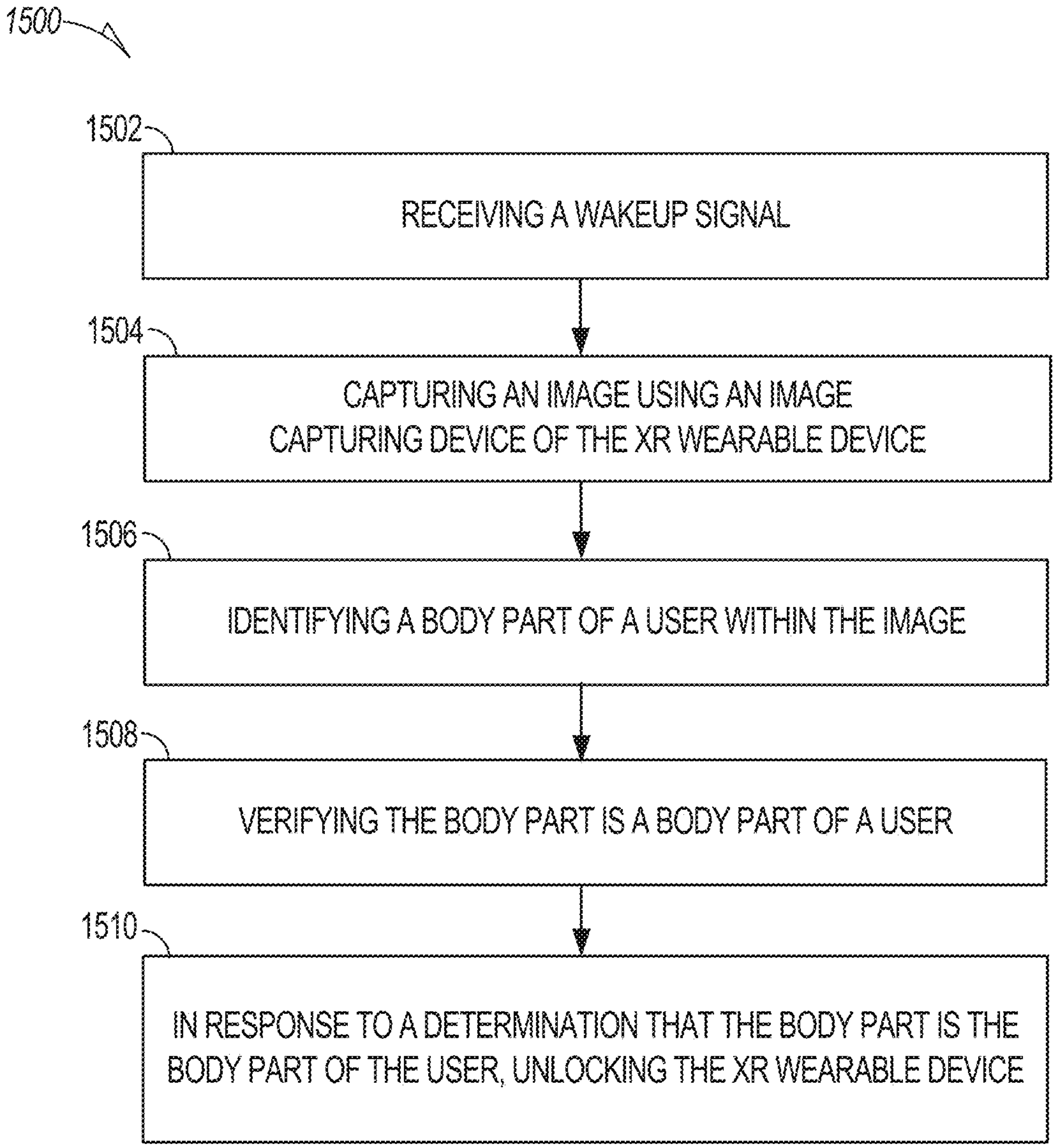
FIG. 15 illustrates a method for unlocking an XR wearable device, in accordance with some examples.

FIG. 15 illustrates a method for unlocking an XR wearable device, in accordance with some examples. The method 1500 begins at operation 1502 with receiving a wakeup signal. For example, the initiation component 838 receives a signal 840 from the wireless module 824, a sensor 804, and/or an IO device 810.

The method 1500 continues at operation 1504 with capturing an image using an image capturing device of the XR wearable device. For example, the initiation component 838 powers up the unlock component 844, which powers up the image capturing device 818 and instructs the image capturing device 818 to capture an image 830.

The method 1500 continues at operation 1506 with identifying a body part of a user within the image. For example, the identification component 828 identifies a body part 836 of a user 868 within an image 830.

The method 1500 continues at operation 1508 with verifying the body part is a body part of a user. For example, the unlock component 844 verifies the body part 836 of the user 834 based on stored BIO ID 848 or sends the image of the body part 836 to the backend 866 for the backend 866 to verify the body part 836 is of the user 868.

The method 1500 continues at operation 1510 with in response to a determination that the body part is the body part of the user, unlocking the XR wearable device. For example, the unlock component 844 sets a state 851 of the XR wearable device 802 to unlocked, which enables the user 868 to use the XR wearable device 802. In some examples, the unlock component 844 may use info 856 to log the user 868 into an interaction platform 222.

The method 1500 optionally includes one or more additional operations, the operations of method 1500 can be performed in a different order, or one or more of the operations of the method 1500 can be optional. The method 1500 may be performed in whole or in part by one or more computing devices such as XR wearable device 802, or an apparatus of one or more computing devices disclosed herein. The functions of a component, such as the unlock component 844, are performed or executed by one or more computing devices configured to perform or execute the functions of the component.

Glossary

"Carrier signal" refers, for example, to any intangible medium that is capable of storing, encoding, or carrying instructions for execution by the machine and includes digital or analog communications signals or other intangible media to facilitate communication of such instructions.

Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" or "module" refers, for example, to a device, physical entity, or logic having boundaries defined by function or subroutine calls, branch points, APIs, or other technologies that provide for the partitioning or modularization of particular processing or control functions. Components or modules may be combined via their interfaces with other components to carry out a machine process. A component or module may be a packaged functional hardware unit designed for use with other components and a part of a program that usually performs a particular function of related functions. Components or modules may constitute either software components (e.g., code embodied on a machine-readable medium) or hardware components. A "hardware component" or "hardware module" is a tangible unit capable of performing certain operations and may be configured or arranged in a certain physical manner. In various examples, one or more computer systems (e.g., a standalone computer system, a client computer system, or a server computer system) or one or more hardware components or software components of a computer system (e.g., a processor or a group of processors) may be configured by software (e.g., an application or application portion) as a hardware component or software component that operates to perform certain operations as described herein. A hardware component or hardware module may also be implemented mechanically, electronically, or any suitable combination thereof. For example, a hardware component hardware module may include dedicated circuitry or logic that is permanently configured to perform certain operations. A hardware component or hardware module may be a special-purpose processor, such as a field-programmable gate array (FPGA) or an application-specific integrated circuit (ASIC). A hardware component or hardware module may also include programmable logic or circuitry that is temporarily configured by software to perform certain operations. For example, a hardware component or hardware module may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component or hardware module mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components or hardware modules can provide information to, and receive information from, other hardware components. Accordingly, the described hardware components or hardware modules may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component or hardware module may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1 is an extended reality (XR) wearable device comprising: one or more processors; and one or more memories storing instructions that, when executed by the one or more processors, configure the XR wearable device to perform operations comprising: receiving a wakeup signal; capturing an image using an image capturing device of the XR wearable device; identifying a body part of a user within the image; verifying the body part is a body part of a user; and in response to a determination that the body part is the body part of the user, unlocking the XR wearable device.

In Example 2, the subject matter of Example 1 includes, wherein the operations further comprise: capturing a plurality of images using the image capturing device; and identifying a gesture performed by the user.

In Example 3, the subject matter of any of Examples 1-2 includes, wherein the body part is one of: an ear, a hand, a finger, a thumb, an eye, a face, an arm, a leg, a torso, rearend, a foot, and a toe.

In Example 4, the subject matter of any of Examples 1-3 includes, wherein the wakeup signal is one of: a signal indicating a case of the XR wearable device is opened, a signal indicating the user is holding the XR wearable device, a signal indicating the XR wearable device is exposed to light, a signal indicating a movement of the XR wearable device has transgressed a threshold distance, and a signal indicating a hinge of the XR wearable device has been opened.

In Example 5, the subject matter of any of Examples 1-4 includes, wherein the identifying the body part of the user within the image further comprises: sending to a backend the image; and receiving an indication of the body part from the backend.

In Example 6, the subject matter of any of Examples 1-5 includes, wherein the operations further comprise: capturing, using a microphone, sound waves; verifying the sound waves were generated by the user; and in response to a determination that the sound waves were generated by the user, unlocking the XR wearable device.

In Example 7, the subject matter of any of Examples 1-6 includes, wherein the receiving the wakeup signal further comprises: in response to receiving the wakeup signal, powering up the image capturing device.

In Example 8, the subject matter of any of Examples 1-7 includes, wherein the verifying the body part further comprises: verifying the body part based on stored biometrics of the body part of the user.

In Example 9, the subject matter of any of Examples 1-8 includes, wherein the operations further comprise: training a neural network to verify the body part of the user, and wherein the verifying the body part is the body part of the user further comprises: verifying, using the neural network, the body part is the body part of the user.

In Example 10, the subject matter of any of Examples 1-9 includes, wherein the XR wearable device is an augmented reality (AR), mixed reality (MR), virtual reality (VR), or XR wearable device.

In Example 11, the subject matter of any of Examples 1-10 includes, wherein the operations further comprise: receiving, from a wireless device, a first code; verifying the first code matches a second code; and in response to a determination that the first code matches the second code, unlocking the XR wearable device.

In Example 12, the subject matter of any of Example 11 includes, wherein the operation further comprises: sending the first code to a backend; and receiving from the backend an indication of whether the first code matches the second code.

Example 13 is a non-transitory computer-readable storage medium including instructions that, when processed by one or more processors of an extended reality (XR) wearable device, configure the XR wearable device to perform operations comprising: receiving a wakeup signal; capturing an image using an image capturing device of the XR wearable device; identifying a body part of a user within the image; verifying the body part is a body part of a user; and in response to a determination that the body part is the body part of the user, unlocking the XR wearable device.

In Example 14, the subject matter of Example 13 includes, wherein the operations further comprise: capturing a plurality of images using the image capturing device; and identifying a gesture performed by the user.

In Example 15, the subject matter of any of Examples 13-14 includes, wherein the body part is one of: an ear, a hand, a finger, a thumb, an eye, a face, an arm, a leg, a torso, rearend, a foot, and a toe.

In Example 16, the subject matter of any of Examples 13-15 includes, wherein the wakeup signal is one of: a signal indicating a case of the XR wearable device is opened, a signal indicating the user is holding the XR wearable device, a signal indicating the XR wearable device is exposed to light, a signal indicating a movement of the XR wearable device has transgressed a threshold distance, and a signal indicating a hinge of the XR wearable device has been opened.

Example 17 is a method performed by an extended reality (XR) wearable device, the method comprising: receiving a wakeup signal; capturing an image using an image capturing device of the XR wearable device; identifying a body part of a user within the image; verifying the body part is a body part of a user; and in response to a determination that the body part is the body part of the user, unlocking the XR wearable device.

In Example 18, the subject matter of Example 17 includes, wherein the method further comprises: capturing a plurality of images using the image capturing device; and identifying a gesture performed by the user.

In Example 19, the subject matter of any of Examples 17-18 includes, wherein the body part is one of: an ear, a hand, a finger, a thumb, an eye, a face, an arm, a leg, a torso, rearend, a foot, and a toe.

In Example 20, the subject matter of any of Examples 17-19 includes, wherein the wakeup signal is one of: a signal indicating a case of the XR wearable device is opened, a signal indicating the user is holding the XR wearable device, a signal indicating the XR wearable device is exposed to light, a signal indicating a movement of the XR wearable device has transgressed a threshold distance, and a signal indicating a hinge of the XR wearable device has been opened.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An extended reality (XR) wearable device comprising:

one or more processors; and one or more memories storing instructions that, when executed by the one or more processors, configure the XR wearable device to perform operations comprising:

receiving a wakeup signal, the wakeup signal generated by a physical movement of a sensor of the XR wearable device, the sensor in a non-powered state prior to the physical movement;

waking up the XR wearable device in response to the wakeup signal;

waiting a predetermined period of time;

capturing an image using an image capturing device of the XR wearable device;

determining, based on processing the image, that the XR wearable device is being worn by a user;

identifying a body part of the user within the image;

verifying the body part is a body part of an authorized user;

displaying on a display of the XR wearable device an XR menu option to unlock the XR wearable device; and in response to a determination that the body part is the body part of the authorized user and that the user selected the XR menu option to unlock the XR wearable device using the verified body part, unlocking the XR wearable device.

2. The XR wearable device of claim 1, wherein the operations further comprise:

capturing a plurality of images using the image capturing device; and in response to a determination that the body part is the body part of the authorized user and a determination that a wake-up gesture is performed by the user, unlocking the XR wearable device.

3. The XR wearable device of claim 1, wherein the body part is one of: an ear, a hand, a finger, a thumb, an eye, a face, an arm, a leg, a torso, rearend, a foot, or a toe.

4. The XR wearable device of claim 1, wherein the wakeup signal is generated by at least one of: a movement sensor of the XR wearable device in response to movement of the XR wearable device or a hinge sensor of the XR wearable device in response to movement of a temple of the XR wearable device.

5. The XR wearable device of claim 1, wherein the identifying the body part of the user within the image further comprises:

sending to a backend the image; and receiving an indication of the body part from the backend.

6. The XR wearable device of claim 1, wherein the operations further comprise:

capturing, using a microphone, sound waves;

verifying the sound waves were generated by the user; and in response to a determination that the sound waves were generated by the user, unlocking the XR wearable device.

7. The XR wearable device of claim 1, wherein the receiving the wakeup signal further comprises:

in response to receiving the wakeup signal, powering up the image capturing device.

8. The XR wearable device of claim 1, wherein the verifying the body part further comprises:

verifying the body part based on stored biometrics of the body part of the user.

9. The XR wearable device of claim 1, wherein the operations further comprise:

training a neural network to verify the body part of the user, and wherein the verifying the body part is the body part of the user further comprises:

verifying, using the neural network, the body part is the body part of the user.

10. The XR wearable device of claim 1 wherein the XR wearable device is an augmented reality (AR), mixed reality (MR), virtual reality (VR), or XR wearable device.

11. The XR wearable device of claim 1, wherein the operations further comprise:

receiving, from a wireless device, a first code;

verifying the first code matches a second code; and in response to a determination that the first code matches the second code, unlocking the XR wearable device.

12. The XR wearable device of claim 11, wherein the operations further comprises:

sending the first code to a backend; and receiving from the backend an indication of whether the first code matches the second code.

13. The XR wearable device of claim 1, wherein the operations further comprise:

refraining from identifying a gesture in identifying the body part of the user within the image.

14. A non-transitory computer-readable storage medium including instructions that, when processed by one or more processors of an extended reality (XR) wearable device, configure the XR wearable device to perform operations comprising:

receiving a wakeup signal, the wakeup signal generated by a physical movement of a sensor of the XR wearable device, the sensor in a non-powered state prior to the movement;

waking up the XR wearable device in response to the wakeup signal;

waiting a predetermined period of time;

capturing an image using an image capturing device of the XR wearable device;

determining, based on processing the image, that the XR wearable device is being worn by a user;

identifying a body part of the user within the image;

verifying the body part is a body part of an authorized user;

displaying on a display of the XR wearable device an XR menu option to unlock the XR wearable device; and in response to a determination that the body part is the body part of the authorized user and that the user selected the XR menu option to unlock the XR wearable device using the verified body part, unlocking the XR wearable device.

15. The non-transitory computer-readable storage medium of claim 14, wherein the operations further comprise:

capturing a plurality of images using the image capturing device; and in response to a determination that the body part is the body part of the authorized user and a determination that a wake-up gesture is performed by the user, unlocking the XR wearable device.

16. The non-transitory computer-readable storage medium of claim 14, wherein the wakeup signal is generated by at least one of: a light sensor of the XR wearable device in response to incident light striking the light sensor, a movement sensor of the XR wearable device in response to movement of the XR wearable device, a hinge sensor of the XR wearable device in response to movement of a temple of the XR wearable device, or a thermal sensor of the XR wearable device in response to heat incident to the XR wearable device.

17. A method performed by an extended reality (XR) wearable device, the method comprising:

receiving a wakeup signal, the wakeup signal generated by a physical movement of a sensor of the XR wearable device, the sensor in a non-powered state prior to the movement;

waking up the XR wearable device in response to the wakeup signal;

waiting a predetermined period of time;

capturing an image using an image capturing device of the XR wearable device;

determining, based on processing the image, that the XR wearable device is being worn by a user;

identifying a body part of the user within the image;

verifying the body part is a body part of an authorized user:

displaying on a display of the XR wearable device an XR menu option to unlock the XR wearable device; and in response to a determination that the body part is the body part of the authorized user and that the user selected the XR menu option to unlock the XR wearable device using the verified body part, unlocking the XR wearable device.

18. The method of claim 17, wherein the method further comprises:

capturing a plurality of images using the image capturing device; and in response to a determination that the body part is the body part of the authorized user and a determination that a wake-up gesture is performed by the user, unlocking the XR wearable device.

19. The method of claim 17, wherein the body part is one of: an ear, a hand, a finger, a thumb, an eye, a face, an arm, a leg, a torso, rearend, a foot, or a toe.

20. The method of claim 17, wherein the wakeup signal is generated by at least one of: a light sensor of the XR wearable device in response to incident light striking the light sensor, a movement sensor of the XR wearable device in response to movement of the XR wearable device, a hinge sensor of the XR wearable device in response to movement of a temple of the XR wearable device, or a thermal sensor of the XR wearable device in response to heat incident to the XR wearable device.

* * * * *